(12) United States Patent
Davidson et al.

(10) Patent No.: US 7,124,006 B2
(45) Date of Patent: Oct. 17, 2006

(54) VEHICLE IDENTIFICATION MEANS DETECTION AND EVASION SYSTEM

(75) Inventors: Ron Yaacov Davidson, 5 Habroshim Street, 30 900 Zichron Yaacov (IL); Nathaniel Davidson, Tel Aviv (IL); Naum Lauenburg, Zoran (IL)

(73) Assignee: Ron Yaacov Davidson, Zichron Yaacov (IL)

(*) Notice: Subject to any disclaimer, the term of this patent is extended or adjusted under 35 U.S.C. 154(b) by 2 days.

(21) Appl. No.: 11/059,392

(22) Filed: Feb. 17, 2005

(65) Prior Publication Data
US 2006/0212196 A1   Sep. 21, 2006

Related U.S. Application Data

(63) Continuation-in-part of application No. 10/640,703, filed on Aug. 13, 2003.

(60) Provisional application No. 60/404,450, filed on Aug. 19, 2002.

(51) Int. Cl.
*G06F 19/00* (2006.01)

(52) U.S. Cl. .................. 701/36; 342/20; 340/425.5

(58) Field of Classification Search .................. 701/1, 701/36; 342/20, 104; 340/425.5, 936, 937, 340/988
See application file for complete search history.

(56) References Cited

U.S. PATENT DOCUMENTS

| | | | | |
|---|---|---|---|---|
| 4,949,088 A * | 8/1990 | Ryan et al. | .................. | 342/20 |
| 4,956,930 A * | 9/1990 | Troncoso | .................. | 40/209 |
| 5,510,793 A * | 4/1996 | Gregg et al. | .................. | 342/20 |
| 5,819,198 A * | 10/1998 | Peretz | .................. | 701/117 |
| 6,118,403 A * | 9/2000 | Lang | .................. | 342/357.09 |
| 6,351,208 B1 * | 2/2002 | Kaszczak | .................. | 340/425.5 |
| 6,400,304 B1 * | 6/2002 | Chubbs, III | .................. | 342/20 |
| 6,675,085 B1 * | 1/2004 | Straub | .................. | 701/93 |
| 6,895,324 B1 * | 5/2005 | Straub | .................. | 701/93 |
| 2003/0052797 A1 * | 3/2003 | Rock et al. | .................. | 340/936 |

* cited by examiner

*Primary Examiner*—Gary Chin

(57) ABSTRACT

A system for detecting and evading vehicle identification means (VIM), comprising: locating device, control device having a plurality of I/O channels, each adapted to receive or transmit serial or parallel data, processing device, electronic storage device comprising at least one database of known VIM coordinates and identification prevention device (IPD) adapted to automatically prevent identification of the vehicle's license plate number, owner, driver or any part or passenger of the vehicle.

40 Claims, 17 Drawing Sheets

To FIG. 6B

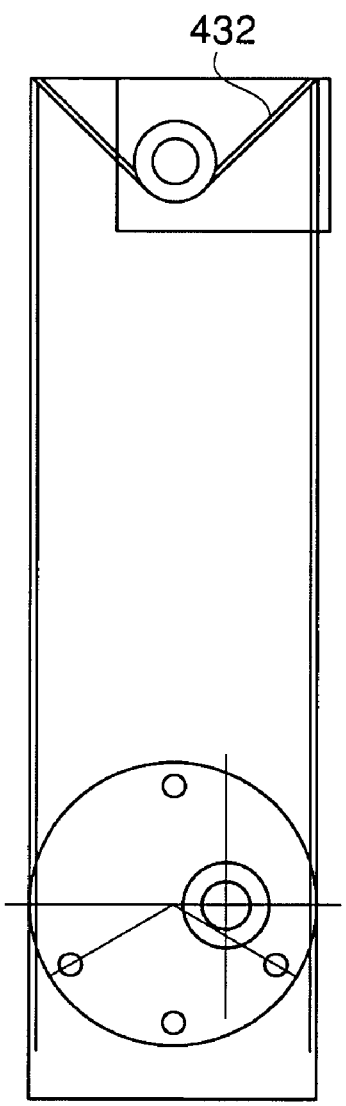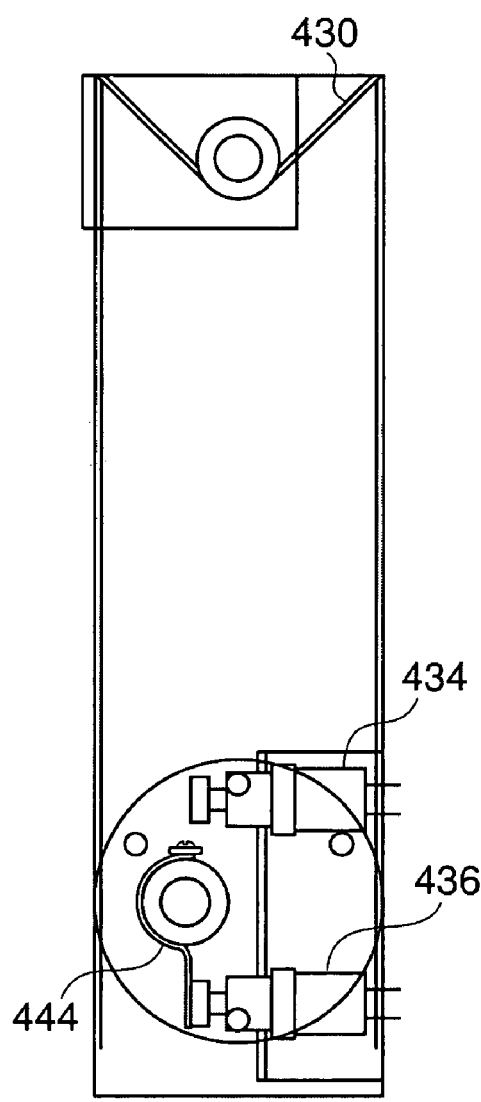
A-A
FIG. 8A
B-B
FIG. 8B

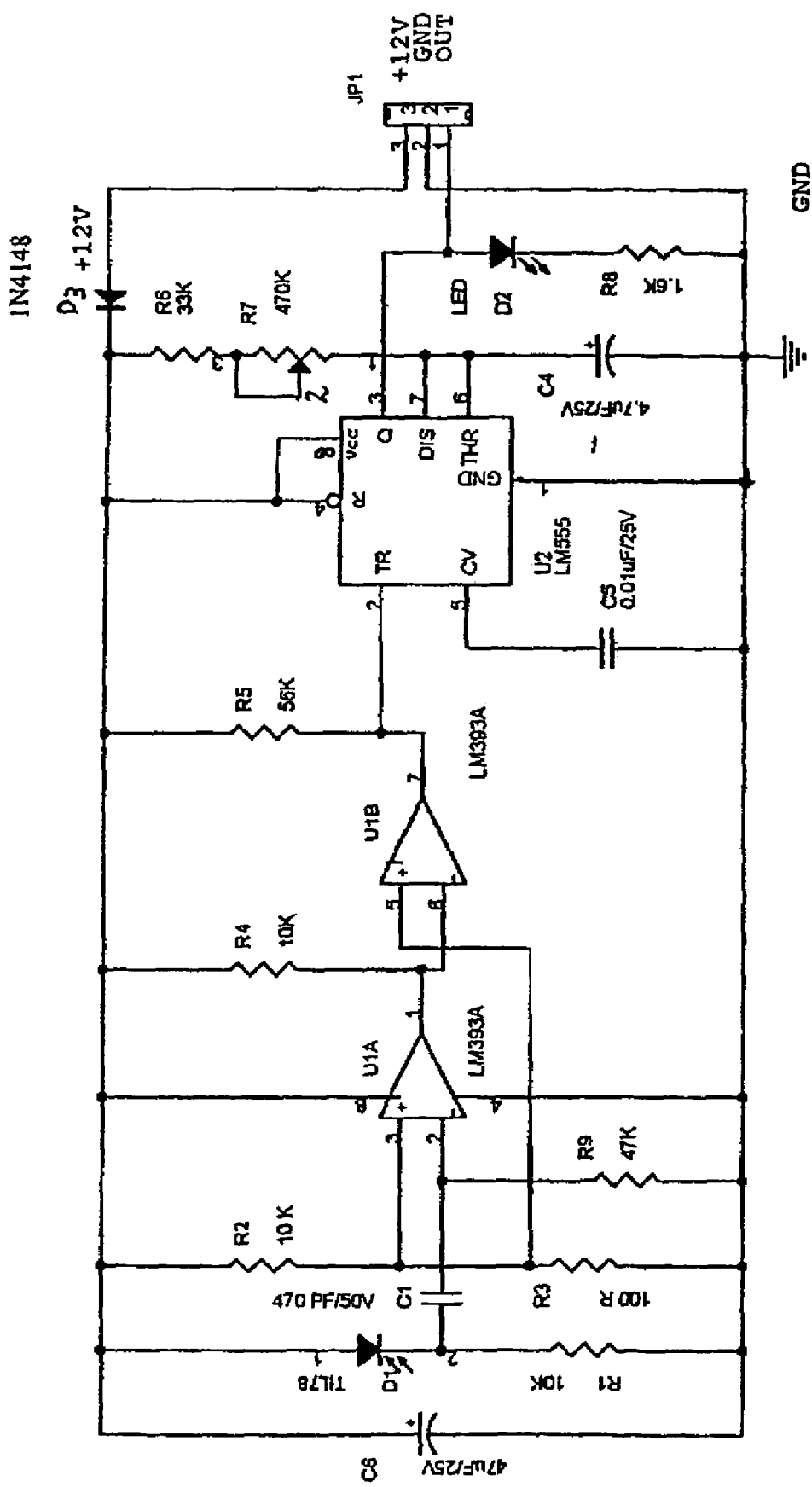
FIG. YY

VEHICLE IDENTIFICATION MEANS DETECTION AND EVASION SYSTEM

CROSS-REFERENCE TO RELATED APPLICATIONS

The present application is a Continuation in Part of U.S. patent application Ser. No. 10/640,703, filed Aug. 13, 2003, which claims priority from U.S. Provisional Patent Application No. 60/404,450, filed Aug. 19, 2002, entitled "ACTIVE SPEED TRAP DETECTION AND EVASION SYSTEM".

FIELD OF THE INVENTION

The present invention relates to a system for automatically detecting vehicle identification means and operating identification prevention measures.

BACKGROUND OF THE INVENTION

Vehicle identification means are used around the world, mostly by law enforcement authorities and in conjunction with various kinds of law enforcement activities, such as, but not limited to speed-traps.

Existing speed-traps fall into two main categories: active speed-traps and passive speed-traps.

Active traps operate by transmitting a signal towards a traveling vehicle and measuring time delay, Doppler effect or other parameters to measure the speed of the vehicle. Active traps typically use radar or laser light for detection. Examples include Digital SMARTCAM, provided by Redflex, of Melbourne, Australia and Moltanova F-6 photo radars, provided by Multanova AG, Seestr. 110, CH-8610 Uster, www.multanova.ch, which record license plate numbers on film, and digital cameras, which store or transmit license plate numbers electronically. Active speed-traps may operate from fixed or mobile locations.

Passive traps operate by identifying a traveling vehicle in two positions and calculating the vehicle's speed using the known distance between the two positions and the time used by the vehicle to travel between them. Passive traps may also use film and/or digital cameras to capture the license plate number.

Other uses of vehicle identification means exist, which are not aimed at speed violations but at various other types of law violations, such as traversing in red light, not keeping an appropriate distance from the vehicle in front, etc. These VIMs use photographic means for capturing the license plate. Examples are MegaCar and CarFlow, available from MegaPixel, Russia.

A number of methods are known for locating a speed-trap. One such method uses an apparatus, such as an RF antenna, for detecting radar signals from a radar-operated speed trap and alerts the driver accordingly. There are several drawbacks to this method. First, the driver is only alerted once the radar beam from the speed trap is incident on his vehicle, which may be too late for reducing his speed. Second, the radar detector may be falsely set-off by devices other than speed-traps, which operate on similar frequencies.

Another method for detecting speed-traps, such as used by Photo-LIDAR, available from Ingram Technologies of Utah, USA, uses laser detectors to detect incident light from active speed-traps using laser light. Similar to radar detectors, the laser detector also alerts the driver only when a laser beam is incident on his vehicle and will not detect speed-traps using other detection methods.

An additional method for detecting speed-traps, which overcomes the shortcomings of the first two methods, uses a combination of a speed-trap location database and a Global Positioning System (GPS) to alert the driver that he is approaching a speed-trap. Various systems of this type are described, for example, in International Published Application WO 01/55744 and in UK Published Applications UK 2353647 and UK 2353650. Existing products using this method include Geodesy GPS SpeedTrap Location System, manufactured by Morpheous, UK, and GPS Warning System available from Origin blue I, UK.

All the above disclosures and products use an updateable database of speed-trap location coordinates, get continuous location readings from the GPS and alert the driver, by various means such as voice alert, beep alert or displayed warning, when he is within a certain range of a speed-trap. The disclosed devices may also determine whether the vehicle is moving in the direction of the speed-trap and only issue an alert if this is the case.

For all the detection and alert systems described above to be effective, the driver is expected to stay alert to the warning signal and reduce his speed accordingly when the signal has been issued. This requires the driver to divide some of his attention from the road. The driver may be tired, or in the middle of a conversation, and not pay attention to the warning signal.

Various active counter-measures for evading speed traps exist in the marketplace, including means for detecting and/or jamming radar signals, in order to avoid detection. The jamming devices, such as the Phantom Radar Jammer, manufactured by Galaxy Descramblers of Illinois, USA, receive the radar gun's signal and piggyback it with noise, so that the signal going back to the radar gun is not recognized by the computer.

Other existing means deal with obscuring the vehicle's license plate from the photo-radar camera. These products, such as the Protector, manufactured by On-Track Manufacturing Corp. of Blaine, Wash., use especially designed license plate covers, comprising a micro-prismatic lens, which bends light like a prism when viewed from a 35° angle. This effect makes the cover reflect the incoming light from the camera's flash, when impinging at 35° horizontally or vertically, with an additional configuration that combines partial horizontal and vertical reflection. The cover looks transparent when viewed from directly behind (or in front of) the vehicle. The effective protection of these products is limited by the narrow angle of protection.

Another product, manufactured by Chimera of New Haven, Conn., provides a different type of micro-prismatic lens, designed to reflect incoming light starting at a predefined angle of 45° and covering the entire range from the starting angle to 180°. The drawback of this type of lens is that it is visible from various angles.

U.S. Pat. No. 4,956,930 to Troncoso describes a license plate cover provided with vanes, designed to obscure viewing of the plate identification from the side.

The drawback of all these counter-measure devices lies in their non-selective use. The measures are permanently operational and thus place the driver in permanent danger of being apprehended.

Published US Patent Application 2002/0022920 provides a system including a positional sensor such as a GPS device. Position information is used to access a database of speed limit and/or speed trap information. Speed limit information is used to control the speed of the automobile as part of a cruise control operation and/or is used to provide the motor vehicle operator with warnings.

GB 2324858 and U.S. Pat. No. 6,111,364 to Davis et al. disclose blinding means directed at photo-flash cameras. The blinding means are triggered by identification of the active photo-flash. Both systems react to an already operational threat.

U.S. Pat. No. 6,351,208 to Kaszczak discloses a device for preventing detection of a traffic violation comprising one or more ultraviolet laser emitters that interfere with the photographing of a traffic violation or the violating vehicle by an automatic camera installed on a traffic signal. UV laser emitters may be used for interfering with black and white cameras, but is usually not useful against digital cameras, and/or color film cameras, such as used nowadays by law enforcement agencies. Even cameras that are sensitive to the UV wavelength may be protected by filters and thus render the invention useless.

U.S. Pat. No. 6,833,910 to Bogh-Andersen discloses a laser transponder for disabling a laser-based speed monitor which is transmitting a monitor laser beam at a moving vehicle by transmitting a jamming laser beam to the laser-based speed monitor. The monitor laser beam is in the shape of a monitor signal that includes monitor pulse trains emitted at a first frequency, while the jamming laser beam is in the shape of a jamming signal that includes jamming pulse trains emitted at a second frequency. The patent does not include any means of preventing vehicle identification.

There is need for an active, universal law enforcement vehicle trap detection system that will be effective against all types of vehicle law enforcement traps and will automatically, upon detecting approach to a trap, operate identification prevention measures to avoid detection of the vehicle or the driver, without the need for the driver to be alert and without reducing the vehicle's cruising speed, and automatically deactivate the identification prevention measures when the vehicle is out of the detection zone.

SUMMARY OF THE INVENTION

According to a first aspect of the present invention there is provided a system for detecting and evading vehicle identification means (VIM), comprising: locating means; control means connected with the locating means, the control means having a plurality of I/O channels, each of the I/O channels adapted to receive or transmit one of serial data and parallel data; processing means connected with the control means; electronic storage means connected with the processing means, the electronic storage means comprising at least one database of known VIM coordinates; and at least one identification prevention device (IPD) connected with the control means, the IPD adapted to prevent identification of at least one of the vehicle's license plate number, owner, driver and interior, the control means adapted to automatically enable and disable at least one of the at least one IPD. The locating means may for example comprise an antenna and a GPS receiver/decoder or a cellular locating device.

According to one preferred embodiment of the present invention, the system additionally comprises at least one VIM detector, and may additionally comprise a single-wire communication channel between the control means and the at least one VIM detector, the single-wire communication channel adapted to enable fast deployment of at least one of the IPDs.

According to another preferred embodiment of the present invention, the serial data channels comprise RS232 channels.

According to yet another preferred embodiment of the present invention, the parallel data channels comprise USB channels.

According to yet another preferred embodiment of the present invention, the processing means comprises a PDA.

According to a further preferred embodiment of the present invention, the at least one database comprises a plurality of databases, each of the databases comprising VIM coordinates for a predefined VIM type. The predefined VIM type may be selected from the group comprising: speed traps, red-light traps, stop-sign traps and inter-vehicle distance traps.

According to another preferred embodiment of the present invention, the database additionally comprises auxiliary coordinates.

According to yet another preferred embodiment of the present invention, the IPD comprises one of a license plate cover, an ID-sticker cover and passenger concealing means, where the license plate cover may comprise one of the group comprising light-scattering LCD glass, polarization LCD glass and electrochromic glass.

According to a further embodiment of the present invention, the IPD comprises a license-plate flipper.

According to another preferred embodiment of the present invention, the automatically enabling the at least one IPD is performed selectively, according to predefined criteria.

According to a second aspect of the present invention, there is provided a method of detecting and evading vehicle identification means (VIM), comprising the steps of: providing a VIM detection and evasion system, comprising: locating means; control means connected with the locating means, the control means having a plurality of I/O channels, each of the I/O channels adapted to receive or transmit one of serial data and parallel data; processing means connected with the control means; electronic storage means connected with the processing means, the electronic storage means comprising at least one database of known VIM coordinates; and at least one identification prevention device (IPD) connected with the control means, the IPD adapted to prevent identification of at least one of the vehicle's license plate number, owner, driver and interior, the control means adapted to automatically enable and disable at least one of the at least one IPD; reading current location indication from the locating means; comparing the current location indication with at least part of the VIM coordinates in the at least one database; and automatically operating, based on the step of comparing, at least one of the at least one IPD.

According to one preferred embodiment of the present invention, the method additionally comprises, following the step of operating, the steps of: reading current location indication from the locating means; comparing the current location indication with at least part of the VIM coordinates in the at least one database; and automatically disabling, based on the second step of comparing, the at least one of the at least one IPD. The locating means may comprise for example an antenna and a GPS receiver/decoder or a cellular locating device.

According to another preferred embodiment of the present invention, the at least one database comprises a plurality of databases, each of the databases comprising VIM coordinates for a predefined VIM type. The predefined VIM type may be selected from the group comprising: speed traps, red-light traps, stop-sign traps and inter-vehicle distance traps.

According to yet another preferred embodiment of the present invention, the database additionally comprises auxiliary coordinates, and the step of comparing may additionally comprise the step of comparing the current location indication with at least part of the auxiliary coordinates.

According to yet another preferred embodiment of the present invention, the step of operating the IPD comprises the steps of: receiving a command comprising the IPD's address from the processing device; and sending an ON signal to the addressed IPD.

According to yet another preferred embodiment of the present invention, the VIM detection and evasion system additionally comprises at least one VIM detector.

According to a further preferred embodiment of the present invention, the step of operating the IPD comprises the steps of: receiving a VIM identification signal from one of the at least one VIM detectors; communicating the signal to the processing means; receiving a command from the processing device for activating one of the at least one IPD; and sending an ON signal to the IPD.

According to yet another preferred embodiment of the present invention, the step of operating the IPD comprises the steps of: receiving a VIM identification signal from one of the at least one VIM detectors; and sending an ON signal to a predefined one of the at least one IPD.

According to yet another preferred embodiment of the present invention, the least one IPD comprises at least one of a license-plate cover, an ID sticker cover and .a license-plate flipper.

According to a third aspect of the present invention, there is provided a system for detecting and evading vehicle identification means (VIM), comprising: control means comprising at least one I/O channel, each of the I/O channels adapted to receive or transmit one of serial data and parallel data;

processing means connected with the control means; at least one VIM detector; and at least one identification prevention device (IPD) connected with the control means, the IPD adapted to prevent identification of at least one of the vehicle's license plate number, owner, driver and interior; the control means adapted to automatically enable or disable at least one of the at least one IPD.

According to another preferred embodiment, the automatically enabling or disabling the at least one IPD is performed selectively, according to predefined criteria.

According to another preferred embodiment, the system additionally comprises a single-wire communication channel between the control means and the at least one VIM detector, the single-wire communication channel adapted to enable fast deployment of at least one of the IPDs.

According to yet another preferred embodiment, the VIM comprises photographic means.

According to a fourth aspect of the present invention, there is provided a method of detecting and evading vehicle identification means (VIM), comprising the steps of: providing a VIM detection and evasion system, comprising: control means comprising at least one I/O channel, each of the I/O channels adapted to receive or transmit one of serial data and parallel data;

processing means connected with the control means; at least one VIM detector; and at least one identification prevention device (IPD) connected with the control means, the IPD adapted to prevent identification of at least one of the vehicle's license plate number, owner, driver and interior; the control means adapted to automatically enable or disable at least one of the at least one IPD; receiving a VIM identification signal from one of the at least one VIM detectors; and communicating the signal to the processing means.

According to one preferred embodiment, the method additionally comprises, depending on predefined criteria, the steps of: receiving a command from the processing device for activating or deactivating one of the at least one IPD; and sending an ON or OFF signal to the IPD, accordingly.

According to another preferred embodiment, the VIM detection and evasion system additionally comprises a single-wire communication channel between the control means and the at least one VIM detector, the single-wire communication channel adapted to enable fast deployment of at least one of the IPDs.

According to yet another preferred embodiment, the VIM comprises photographic means.

According to a fifth aspect of the present invention, there is provided a system for detecting and evading vehicle identification means (VIM), comprising: locating means; control means connected with the locating means, the control means having a plurality of I/O channels, each of the I/O channels adapted to receive or transmit one of serial data and parallel data; processing means connected with the control means; electronic storage means connected with the processing means, the electronic storage means comprising at least one database of known VIM coordinates; and at least one identification prevention device (IPD) connected with the control means, the IPD adapted to prevent identification of at least one of the vehicle's license plate number, owner, driver and interior, the control means adapted to automatically select at least one of the at least one IPD and to selectively activate or deactivate the selected IPD according to predefined criteria.

According to one preferred embodiment, the predefined criteria for selectively activating or deactivating the selected IPD is selected from the group comprising predefined frequencies, predefined frequency ranges and predefined digital signal signatures, where the IPD may comprise one or more light sources, and wherein the one or more light sources may comprise one or more laser diodes.

According to another preferred embodiment the one or more laser diodes comprise one or more tunable laser diodes.

According to another preferred embodiment, the one or more light source comprise light sources having different wavelengths.

In a sixth aspect of the present invention, there is provided a method of detecting and evading vehicle identification means (VIM), comprising the steps of: providing a VIM detection and evasion system, comprising: locating means; control means connected with the locating means, the control means having a plurality of I/O channels, each of the I/O channels adapted to receive or transmit one of serial data and parallel data; processing means connected with the control means; electronic storage means connected with the processing means, the electronic storage means comprising at least one database of known VIM coordinates; and at least one identification prevention device (IPD) connected with the control means, the IPD adapted to prevent identification of at least one of the vehicle's license plate number, owner, driver and interior, the control means adapted to automatically select at least one of the at least one IPD; reading current location indication from the locating means; comparing the current location indication with at least part of the VIM coordinates in the at least one database; and selectively enabling or disabling, based on the step of comparing, the selected IPD, the selective enabling or disabling based on predefined criteria.

According to one preferred embodiment, the predefined criteria are selected from the group comprising predefined frequencies, predefined frequency ranges and predefined digital signal signatures.

According to an seventh aspect of the present invention, there is provided a system for detecting and evading vehicle identification means (VIM), comprising: control means comprising at least one I/O channel, each of the I/O channels adapted to receive or transmit one of serial data and parallel data;

processing means connected with the control means; at least one VIM detector connected with the control means; and at least one identification prevention device (IPD) connected with the control means, the IPD adapted to prevent identification of at least one of the vehicle's license plate number, owner, driver and interior; the control means adapted to automatically select at least one of the at least one IPD and to selectively activate or deactivate the selected IPD according to predefined criteria.

According to one preferred embodiment, the at least one VIM detector comprises at least one fast slave flash trigger adapted to identify one or more light frequency ranges, where the at least one fast slave flash trigger may comprise a plurality of parallel flash triggers, each adapted to identify a predefined light frequency range.

According to another preferred embodiment, the predefined criteria for selectively activating or deactivating the IPD is selected from the group comprising predefined frequencies, predefined frequency ranges and predefined digital signal signatures.

According to another preferred embodiment, at least one of the IPD and the VIM detector communicates with the control means wirelessly, wherein the wireless communication comprises Bluetooth communication. According to another preferred embodiment, the VIM detector is connected with the IPD.

According to yet another preferred embodiment, the VIM detector communicates with the IPD wirelessly, wherein the wireless communication comprises Bluetooth communication.

According to a eighth aspect of the present invention, there is provided a method of detecting and evading vehicle identification means (VIM), comprising the steps of: providing a VIM detection and evasion system, comprising: control means comprising at least one I/O channel, each of the I/O channels adapted to receive or transmit one of serial data and parallel data;

processing means connected with the control means; at least one VIM detector; and at least one identification prevention device (IPD) connected with the control means, the IPD adapted to prevent identification of at least one of the vehicle's license plate number, owner, driver and interior; the control means adapted to automatically select at least one of the at least one IPD and selectively activate or deactivate the selected IPD according to predefined criteria; receiving a VIM identification signal from one of the at least one VIM detectors; and communicating the signal to the processing means.

According to one preferred embodiment, the at least one VIM detector comprises at least one fast slave flash trigger adapted to identify one or more light frequency ranges, wherein the at least one fast slave flash trigger may comprise a plurality of parallel flash triggers, each adapted to identify a predefined light frequency range.

According to another preferred embodiment, the predefined criteria for selectively activating or deactivating the IPD are selected from the group comprising predefined frequencies, predefined frequency ranges and predefined digital signal signatures.

According to another embodiment of the present invention, the IPD comprises one or more light sources, wherein the one or more light sources may comprise one or more laser diodes, preferably tunable laser diodes. Alternatively, the one or more light sources may comprise light sources having different wavelengths.

According to an ninth aspect of the present invention, there is provided a system for detecting and evading vehicle identification means (VIM), comprising: at least one VIM detector; and at least one identification prevention device (IPD) communicating with the IPD, the IPD adapted to prevent identification of at least one of the vehicle's license plate number, owner, driver and interior; the VIM detector adapted to automatically activate or deactivate at least one of the IPD.

According to one embodiment, the at least one VIM detector comprises a radar detector.

According to a tenth aspect of the present invention, there is provided a license plate covering system comprising: a power source; a revolving wrapping belt mounted around two bearings, the wrapping belt comprising a cut-out window; and one or two motors connected with the bearings, the motors having a circular motion.

According to a eleventh aspect of the present invention, there is provided a license plate covering system comprising: a power source; a shaft connected with a motor having circular motion; a string connected with the shaft; and a blind connected with the string and wrapped around a torsion pulley.

According to a twelfth aspect of the present invention, there is provided a license-plate flipping device for flipping a vehicle's license plate 180 degrees around a horizontal or vertical pivot axis, wherein the distance of the pivot axis from the vehicle's body is less than half the license-plate's size in the dimension orthogonal to the pivot axis.

According to one preferred embodiment, the license-plate flipping device comprises: a power source; a panel attached to the license-plate along the back thereof; two gear motors having respective shafts, the shafts respectively connected with the panel on the panel's two horizontal sides; two arms connected respectively at one end thereof with the two motor shafts; two beams connected respectively to the other end of the two arms; a rod spanning the two beams parallel to the longitudinal axis of the license-plate; two torque springs, each respectively mounted between one of the arms and one of the beams; two micro-switches attached to one of the motor shafts; and a leaf spring adapted to alternately exert force on each of the micro-switches.

According to another preferred embodiment, the license-plate flipping device comprises: an actuator, comprising a power source; a linear motor connected with the power source; a shaft connected with the motor, the shaft having a linear motion; a multi-link connected with the shaft; an axel connected with the shaft and with the license plate, the axel inducing a circular motion upon the license plate; two limit switches; and two stoppers respective to the two limit switches, for stopping the motor's operation; and a spring mounted between the actuator and a base, the spring exerting force on the license plate. The motor may alternatively be an electric motor and the shaft replaced by a screw, which is in turn connected to a shaft. According to another preferred embodiment, the license-plate flipping device comprises: a power source; a motor connected with the power source; a shaft connected with the motor, the shaft having a circular motion; one or two trolley systems connected with the shaft, each the trolley systems comprising: two bearings; a timing belt mounted between the two bearings; a belt pulley suspended inside the belt; and a shaft connected with the belt pulley and with the license plate.

According to a thirteenth aspect of the present invention, there is provided a fast slave flash trigger circuit comprising: a phototransistor, operable to deliver a logical "high" signal upon picking up a predefined wavelength range; a dual differential comparator connected with the phototransistor, for receiving the logical "high" signal and outputting a logical "low" signal; and a monostable multi vibrator (MMV), for receiving the logical "low" signal from the comparator and outputting a signal of predefined length, wherein the circuit is connected through a 3-lead connector to a constant +12V power supply and to common, the 3-lead connector additionally operable to hold the output signal of the circuit.

BRIEF DESCRIPTION OF THE DRAWINGS

FIGS. 8A and 8B are cross sections of the license-plate flipper of FIG. 7, along section lines A—A and B—B respectively;

FIG. 11 is an electric scheme of a special flash sensor according to an embodiment of the present invention;

DETAILED DESCRIPTION OF PREFERRED EMBODIMENTS

Figure 1:
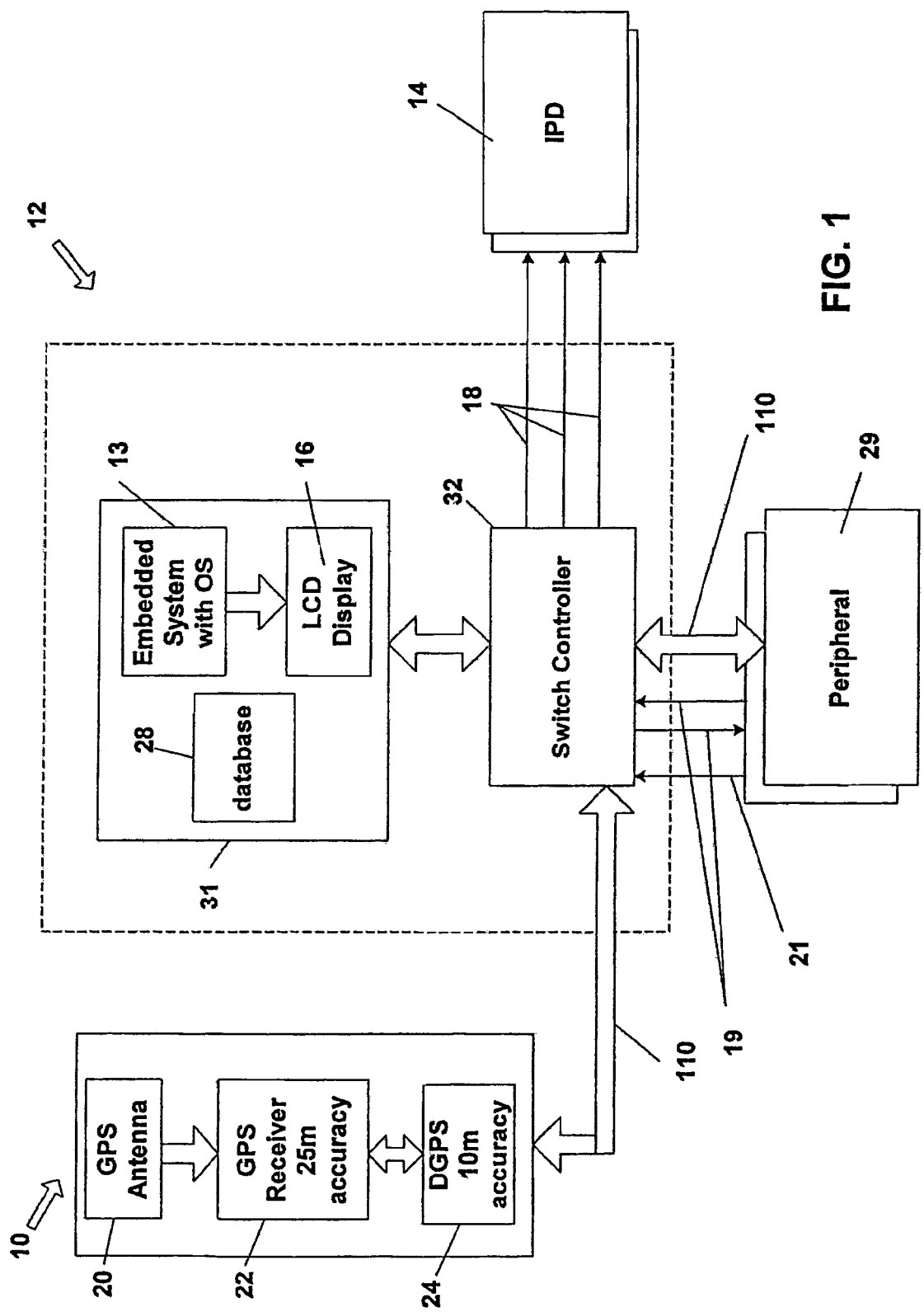
FIG. 1 is a schematic block diagram of the system of the present invention.

In the following detailed description, numerous specific details are set forth regarding the system and method and the environment in which the system and method may operate, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention. Moreover, various examples are provided to explain the operation of the present invention. It should be understood that these examples are exemplary. It is contemplated that there are other methods and systems that are within the scope of the present invention. Also, the same reference numerals are used in the drawings and in the description to refer to the same elements to simplify the description.

The system of the present invention is an active vehicle identification means (VIM) detection and evasion system for automatically activating identification prevention devices (IPD) when it is determined that the vehicle is approaching an identifying means and subsequently de-activating the same IPD according to pre-determined criteria. The system thus frees the driver from the need to be alert to any audio/visual warning signals and slow his traveling speed accordingly, and shortens the timeframe of active IPD operation to the necessary minimum. The system also enables the driver to drive freely through toll-roads, without the danger of being identified. In another application, the system of the present invention may contribute to privacy requirements, whether by political or other national bodies or by private citizens wishing to prevent others from knowing their whereabouts. The IPDs used in conjunction with the present invention may prevent identification of the vehicle's license plate or of the vehicle's owner or driver, such as an ID sticker, or the identification of any part or passenger of the vehicle.

FIG. 1 is a schematic block diagram of the system of the present invention. The main functional blocks of the system are a locating system, generally denoted by numeral 10, a control and processing unit, generally denoted by the numeral 12, and one or more IPDs, generally denoted by numeral 14. The control and processing unit 12 comprises an embedded system 13, capable of supporting an Operating System (WinCE, PalmOS, Linux, DOS etc.). The embedded system 13, together with a display 16, is preferably implemented with a PDA device 31. The control and processing unit 12 additionally comprises a switch controller 32, designed for regulating and switching I/O communication between embedded system 13, locating system 10 and other peripherals 29, as will be described in detail hereinbelow. Switch controller 32 is also responsible for controlling On/Off signals to IPDs 14. Communication cables, such as a 25-pin cables (110) connect the locating system 10, each peripherals 29 and the PDA 31 with the switch controller 32. These system components communicate over the e.g. 25-pin cables in RS232 and/or USB protocols.

The locating system 10 comprises an antenna 20, for receiving signals from GPS (Global Positioning System) satellites, and a GPS receiver/decoder 22. The GPS receiver/decoder and the antenna are standard devices, such as Saphire GPS mouse from Royatek at www.royaltek.com (with RS232 cable) or GPS25-LVC and GPS36 TracPak, respectively, both available from Garmin Ltd., Kansas City, USA. The GPS receiver/decoder processes the received GPS signals and outputs a data stream that defines the current position of the vehicle. The accuracy of the GPS receiver/decoder is in the range of 25 m. Optionally, locating system 10 may also comprise a correction module 24, such as DGPS Invicta 210L, available from Dtarlink Inc., Austin, Tex., USA, whereby the detection accuracy is improved to about 10 m.

In another preferred embodiment of the present invention, cellular location devices, such as CDMA cell sites may be used for location determination, instead of the GPS receiver/decoder 22, or a hybrid device, such as gpsOne, available from Qualcomm Inc., California, which provides highly accurate positioning by combining signals from GPS satellites and wireless networks. All references hereinbelow to GPS are made by way of an example and may be replaced by any other locating or positioning device.

The control and processing unit 12 additionally comprises a speed-trap coordinates database 28 and optionally additional databases related to other law-enforcement trap locations. Alternatively, database 28 may include, in a single database, coordinates for various types of traps other than speed traps. All references to speed-trap coordinates databases 28 below should be read as referring to the various types of VIM coordinates.

IPD 14 may comprise various devices designed at preventing identification of the vehicle and/or the vehicle's owner or driver or any part or passenger of the vehicle such as, but not limited to:

a license-plate flipping mechanism, as will be described in detail hereinbelow a license-plate/ID sticker cover comprising standard light scattering LCD (dispersed polymer) normally opaque or partially opaque, that becomes transparent when a current with sufficient voltage is applied, available from Laminated-Technologies
(www.laminatedtechnologies.com)

Polarization (twisted pneumatic) LCD glass (by Opterl at www.optrel.com) that is normally transparent and becomes dark when sufficient voltage/current is applied Electrochromic glass (SAGE Electrocromichs of Faribault, Minn.) that becomes dark when sufficient voltage/current is applied.

An additional type of IPD 14, according to a preferred embodiment of the present invention, is a light source, e.g. laser diode, aimed at a photographic device, e.g. photo-radar for temporarily blinding it. The film used in the cameras may be blinded when a strong light, direct and/or indirect, penetrates the camera while active. The same is true for digital cameras sensors. For example, films and optical sensors used in digital cameras might be extremely sensitive to infra-red light. A light source having a frequency of 830 nm may thus be used as a blinding device. Other spectrum frequencies are also sufficient to blind the photographic device.

In an attempt to out-maneuver such blinding means, the photographic device may be equipped with a filter to a specific spectrum, to avoid the blinding circumstance. According to a preferred embodiment of the present invention, the IPD may overcome the filtering by using multiple light sources of different frequencies. Alternatively, or in conjunction, tunable laser diodes, such as diodes in the TLB-6000 (Vortex™) series, available from Bookham Inc. of San Jose, Calif., may be used, adjustable to emitting one of several different wavelengths. These techniques rule out the possibility of using anti-blinding filters, since the number of filters needed to prevent blinding by the multiple frequencies will effectively block out the minimal amount of light required for photographing.

The light source(s) may be directed at the photographic device or at alternatively at the vehicle's license plate, whereby a reflected light from the license plate will cause the temporary blinding. As opposed to the prior-art flash blinding means, the laser blinding means are effective both in daylight and in the dark. When combined with the pre-knowledge, either from database or by real-time identification, according to the present invention, the blinding means may be activated before the photographic device's flash, or on a constant basis.

Another manner in which photographic devices may try to out-maneuver blinding counter-measures is by avoiding flash photography (e.g. infra-red), but rather flood the enforcement area and a certain area preceding it with a constant visible or invisible light (e.g. infra-red). Any flash-back means installed on an approaching vehicle would be triggered when the vehicle enters the larger area, and since prior art flash-back systems only operate for a short period of time, they would not be able to operate once reaching the enforcement area, where the photographic device operates. There will not be a big enough intensity change to trigger the flash-back device.

According to another preferred embodiment of the present invention, a special flash sensor has been designed, as shown in FIG. 11. The circuit is a very sensitive slave flash trigger. A received flash signal is picked up by transistor D1—TIL78—a low cost, high quality, fast NPN silicon infrared phototransistor. D1, only sensitive to infrared signals, acts as a preliminary filter by rejecting other unnecessary wavelengths of ambient light and/or random light sources. Only a high power flash signal is recognized. Receiving an external flash signal causes D1 to saturate and deliver a "high" logical state to the inverting input of U1A—half of LM393A—a dual differential comparator. This input is normally at a logical "low" state by means of pulldown resistor R1. Capacitor C1 and resistor R9 act as a pulse shaper emitting a square signal, which is required for the correct operation of U1A. The non-inverting input of U1A is held at about 0.1V by means of a voltage divider, consisting of resistors R2 and R3. Hence, activation of D1 toggles the output of U1A—from a logical "low" to a logical "high". U1B—the other half of LM393A—acts as a signal inverter for the logical states of U1A output, thus outputting a "high" to "low" transient needed to activate device U2—the well-known 555 timer. U2 is configured as a "Monostable Multi Vibrator" (MMV), meaning that upon a "high" to "low" pulse at its trigger input, it outputs a signal of a pre-defined length. The length of the output signal is defined by the values of resistors R6, R7, and capacitor C4, while capacitor C5 is part of the working environment of U2. According to given values, output signal length may vary (preset of variable resistor R7) between 0.2 and 2.6 seconds. Signal length is preset to about 2 seconds, which is sufficient for reliable triggering of the main system circuit. Output Q of U2 can sink or source up to 200 mA, making it suitable for triggering small and medium loads, such as lamps, relays, LEDs, etc.—either connected to power or common voltage rails. Currently, U2 sources approximately +12V to activate the external main circuit. LED D2, operating through resistor R8, is used to monitor the logical state of the circuit's output signal. The circuit is connected through a 3-lead connector JP1 to a constant +12V power supply and to common (0V) GND. JP1 also holds the output signal of the circuit. Diode D3, 1N4148, protects the circuit against reversed voltage connection, while capacitor C6 is used to smooth supply voltage and omit any voltage ripples that might disturb the operation of the circuit.

In the context of the present invention, the special flash sensor of FIG. 11, equipped with one or more parallel circuits comprising photo diodes for various wavelengths, or a multi-wavelength diode with or without filters, may serve for fast identification of light intensity change and trigger any one or more IPDs, mechanical or other, for any preset length of time, as described hereinabove. Another advantage of the special flash sensor is its ability to avoid false alarms, such as might occur for example when coming out of a tunnel, triggered by the change in light intensity. The filters used in conjunction with the special flash trigger, or the specific diode(s) used, will only trigger an alarm in context with the predefined wavelengths.

As an alternative to the special flash trigger described above, the laser transponder described in U.S. Pat. No. 6,833,910 could be used for the purpose of identifying and jamming laser-based speed monitors. In the context of the present invention, the laser transponder system could be used to determine the type of laser device transmitting the laser beam at the vehicle, and operate the identification prevention means only if the device is identified as a photo-laser. Additional criteria may serve for deciding whether to operate the IPD, such as pre-stored knowledge of laser devices which are hand-held, as opposed to others which may be installed on poles. The selective conditions for operating the IPD may include a preference for not e.g. flipping or covering the license plate if a hand-held device is detected.

One or more wires 18 connect the control and processing unit 12 to the IPDs 14, to allow for selective deployment of the IPDs to the front and/or back license plates, according to pre-programmed criteria, as will be explained in detail below.

Other peripherals, generally denoted by numeral 29, may be connected with the switch controller 32 with one or more communication protocols, such as RS232, USB, Fire-wire etc. Peripherals 29 may comprise various devices capable of sending/receiving information about threats to/from the switch controller 32 and the PDA 31. For example, peripheral 29 may comprise a "blinder" laser speed-trap counter-measure (www.blinder.dk). Upon detection by the "blinder" of an active speed-trap, the "blinder" sends an interrupt to the switch controller 32, requesting communication with the PDA, for communicating to the PDA details about the detected speed-trap, such as type, distance etc. Alternatively, peripheral 29 may comprise a multi-band, multi-frequency signal detection device as described in PCT Publication No. WO 03/034087. Peripheral 29 may comprise one or more devices or combination of devices such as described above or any other laser, radar, speed-trap, inter-vehicle distance detectors, red light detectors, toll road identification means, or any other vehicle identification means (VIM). In another embodiment, peripheral 29 may be directed at identifying a special type of VIM, such as the Marom Traffic Law Enforcement System available from Elbit of Haifa, Israel. The system uses electro-optic and infra-red technologies. The automated, lane-based traffic system measures speed and distance between vehicles traveling in a given lane. Every vehicle passing between the electro-optic head and retro-reflectors breaks the two beams and triggers computer to measure speed, acceleration, headway and vehicle length. If any vehicle exceeds any present parameters the high resolution digital cameras photograph front and rear of vehicle, and all violation data are stored on digital audio tapes. In order to detect the two-infrared-beams device, a photo-diode capable of detecting the required bandwidth (e.g. 820 to 880 nm) such as High-Sensitivity GaAlAs Photodiode ODD45W/95W, available from Opto Diode, Corp., California, may be installed on the vehicle, preferably at the front. The photo-diode will be connected with the switch controller 32 via a communication channel 21 as will be described hereinbelow.

Peripheral 29 may have an additional communication channel 21 with switch controller 32, for transmitting discrete input signals, to enable fast on/off operation of an IPD, with or without involving the PDA 31 and possibly while the peripheral 29 is not in direct communication with the PDA. This immediate "emergency" communication causes the switch control to initiate a timer, for a predefined period in which the IPD will be operated. The timer uses low frequency clock 540. This mode enables fast operation of IPD until the peripheral is able to communicate with the PDA. At this point control goes to the PDA, for deciding whether the IPD should be operated, according to the logic described below. Peripheral 29 synchronizes its communication with switch controller 32 by using two single-wire communication lines 19, for sending 'request-to-send' signals and receiving 'clear to send' signals.

In an alternative embodiment, peripheral 29 may communicate with either PDA 31 or directly with IPD 14 using wireless communication such as bluetooth. A wireless communication between the switch controller 32 and the IPD 14 is also within the scope of the present invention, as are all combinations of wired and wireless communication for connecting peripheral 29 with IPD 14, with or without the help of switch controller 32.

Trap coordinates database 28 preferably stores coordinates of all the fixed traps in a relevant area, such as a country, a state, or a part thereof. The coordinates may be downloaded from existing databases on the Internet. The database may also be manually updated by the user, using the PDA, through a user interface that allows him to enter coordinates of newly discovered VIM, or any other object of interest. The user may also press a designated button when driving by a "new" VIM, not registered in the database; the system will store this new coordinate along with all other coordinates needed for calculating when the IPDs should be activated/de-activated. New coordinates may also be updated by connection of the PDA (including database) to the Internet. Upon connection to the Internet, the "new" coordinates collected and stored may be relayed to the "manufacturer's" database for future updates.

Trap coordinates database 28 preferably also stores, for each stored coordinate, N supplementary coordinates representing N sequential locations the vehicle should travel by if it is headed towards that specific VIM. The vehicle does not have to pass directly over the coordinate but rather, pass within a predefined radius of the coordinate, whether principal or auxiliary. When "new" coordinates are manually added during driving, the supplementary coordinates are also added by the system from a constantly updated "recent history" database.

In one preferred embodiment of the present invention, speed trap database 28 may additionally store "out of range" coordinates, for disabling the IPD once the vehicle has passed the VIM and is out of range of detection.

Figure 2:
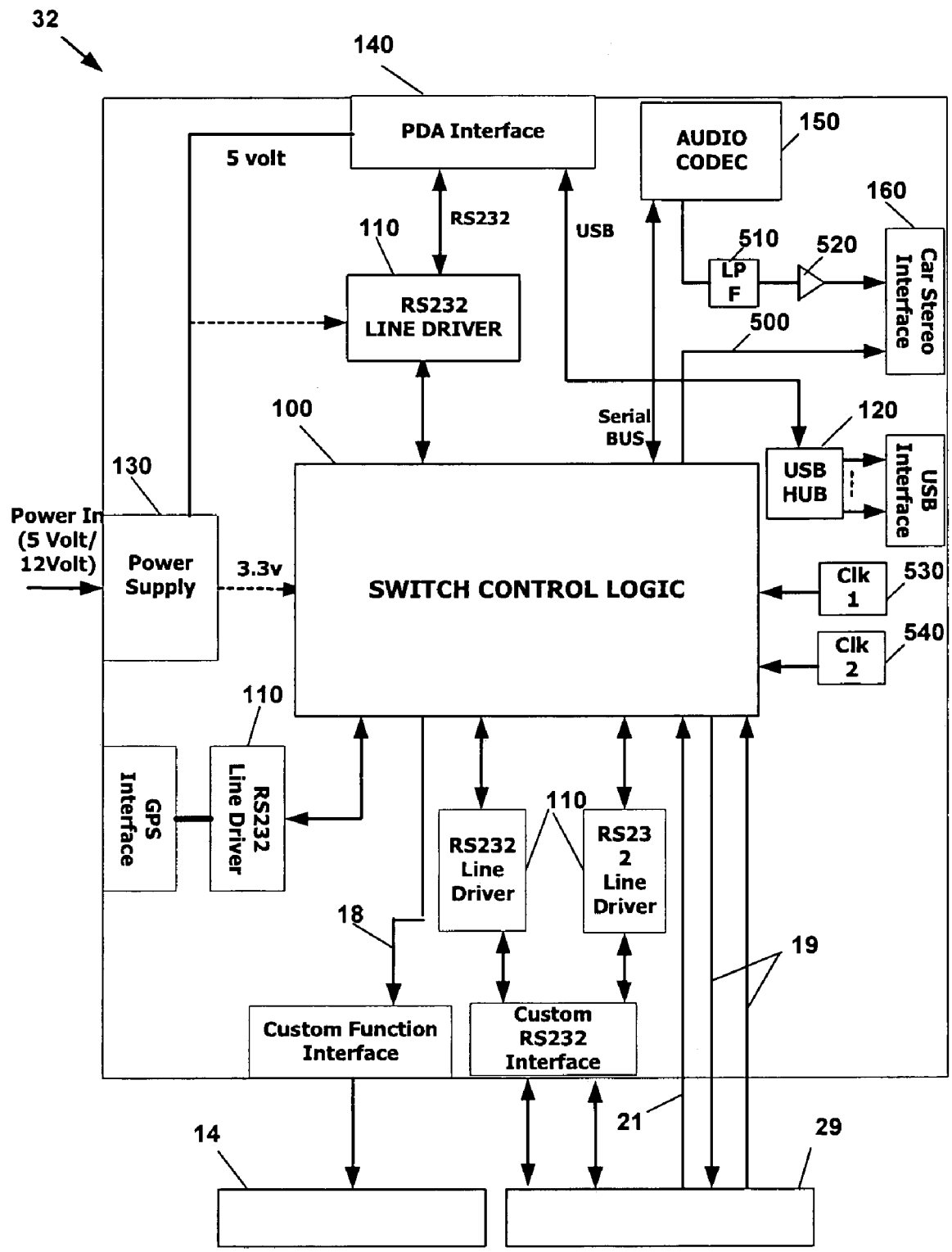
FIG. 2 is a schematic block diagram of the switch controller according to a preferred embodiment of the present invention.

FIG. 2 is a block diagram of switch controller 32 according to a preferred embodiment of the present invention, comprising:

switch control logic 100, a programmable logic device such as Altera EPM7032/EPM7064 or Altera Cyclon3kXXX. The switch control logic 100 comprises a hardware logic-gate implementation of all logic functions for which the switch control is responsible. Amongst others, it comprises an implementation of a logic MUX function used to set the RS232 communication channel between the PDA 31 and GPS/peripheral.

a plurality of RS232 line drivers 110, connecting the switch control logic 100 with peripherals 29 and with the GPS receiver/decoder 22, for converting RS232 signals to TTL level signals;

a USB hub module 120, such as TUSB2046B by TI, connected directly with the PDA USB port, for enabling concurrent communication with a plurality of USB peripherals and with the USB port of the PDA 31;

a plurality of discrete on/off output connections 18, for single-wire fast communication to IPDs 14;

a DC-to-DC power supply unit 130, connected with the vehicle's power supply directly or by a 12V to 5V converter, such as A-6017-xxx Cigarette Adapter Cable by Rikaline at www.rikaline.com for converting from 5V/12V to 3.3V;

a PDA interface connector 140, such as serial-port, infrared, SDIO, CFIO, custom sleeve or any other suitable interface known in the art; and A high frequency clock 530 and a low frequency clock 540. The low frequency clock 540 is used for counting seconds.

For the purpose of enhancing audio alerts initiated by the PDA 31, switch controller 32 may additionally comprise a dedicated discrete signal 500 from switch control logic 100 directly to the mute signal of the vehicle's stereo (not shown). Signal 500 should comply with the standard mute-signal voltage. In a second embodiment, discrete signal 500 may be connected with radio switch 160, such as Audio Call, by Vega Elettronica, Madrid, Spain. This second embodiment may additionally comprise connecting the PDA 31 earphone outlet, via a voltage/current amplifier, to radio switch 160 (not shown). In a third embodiment, the PDA 31 may send a digital audio signal to switch control logic 100. Switch control logic 100 communicates the signal to an audio codec 150, in which the signal is translated to an analog signal, which then passes through low-pass filter 510 and amplifier 520 to radio switch 160. The radio switch 160 is usually used for hands-free mobile phone speaker.

The control logic 100 and the PDA 31 software communicate using a custom communication protocol that enables more than one RS232 channel to be connected to the PDA, by switching between the different channels, as will be described below, in conjunction with FIG. 3.

Figure 3:
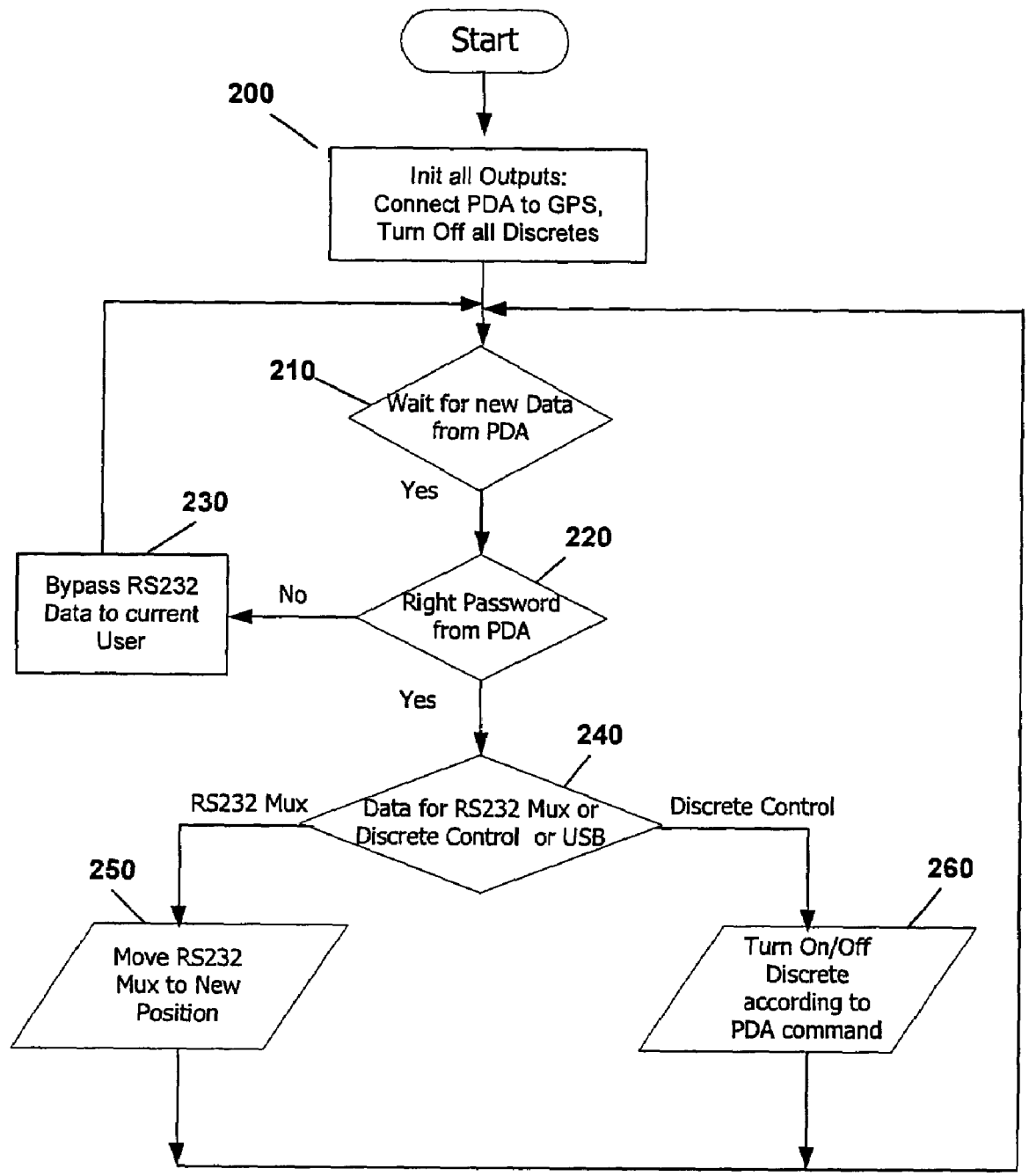
FIG. 3 is a flowchart describing the hardware logic of the PDA transmit request according to a preferred embodiment of the present invention.

FIG. 3 is a flowchart describing the hardware logic of the PDA 31 transmit request to the switch controller 32. In step 200, system initialization, the PDA 31 is connected to the location unit 10 and all discrete channels 18 are turned Off. In step 210, the switch control logic 100 enters a waiting loop for new data from the PDA 31. When data is received, a "password" verification takes place (step 220). If the password test fails, the current RS232 channel is ignored in step 230 and the system loops back to step 210 to wait for another communication. If the password test is successful, switch control logic 100 parses a second command, in step 240, to identify the unit to be communicated. If the data is for the RS232 MUX, the switch controller moves the MUX to a different peripheral, as indicated, in step 250, to enable communication to the designated peripheral, e.g. enabling/disabling the peripheral according to predefined criteria. Alternatively, if the data indicates a discrete control (step 260), the indicated IPD is turned On/Off according to the command received.

Figure 4:
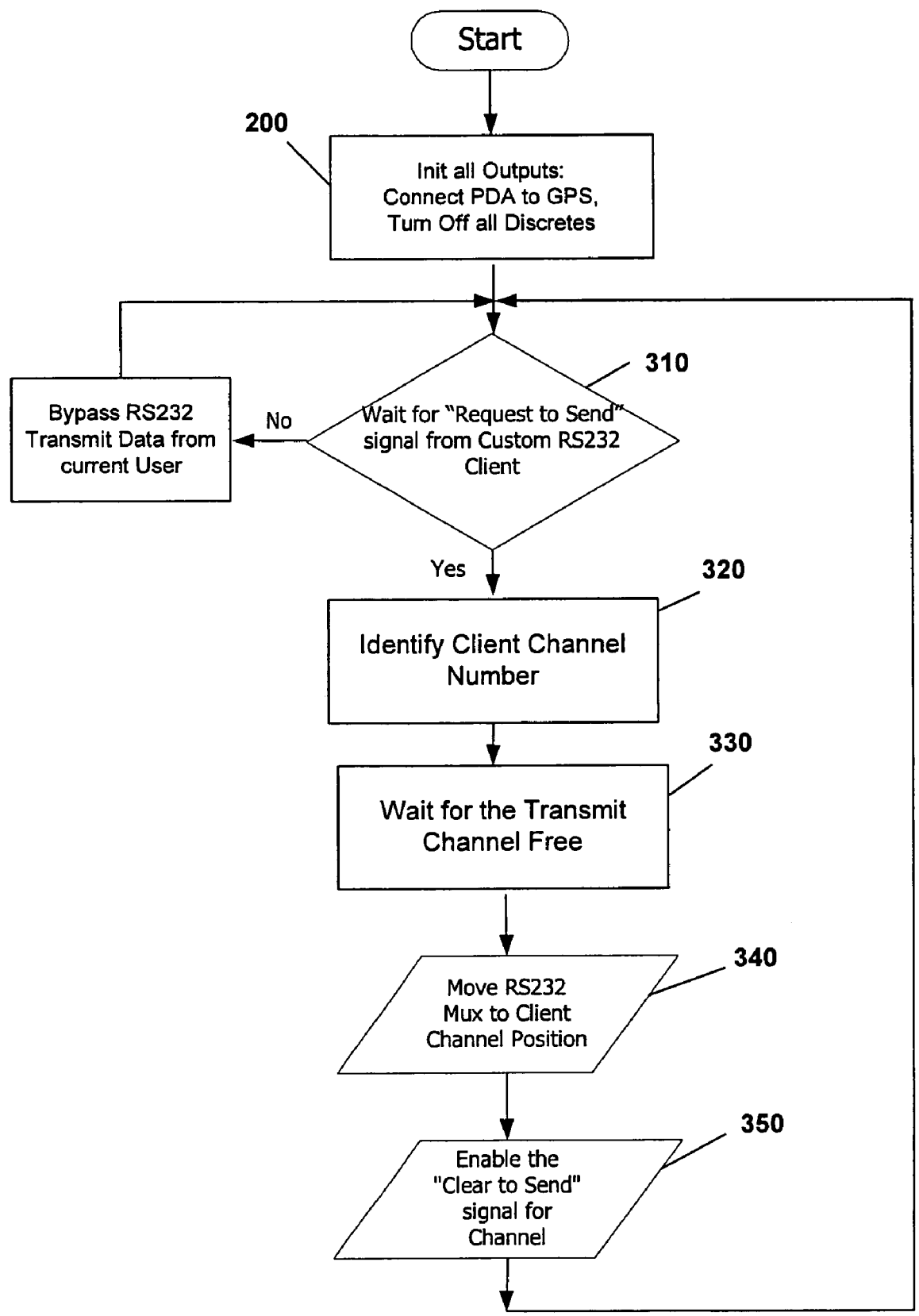
FIG. 4 is a flowchart describing the hardware logic of a peripheral 29 transmit request to the switch controller 32.

FIG. 4 is a flowchart describing the hardware logic of a peripheral 29 transmit request to the switch controller 32. In step 200 (identical to step 200 of FIG. 3), system initialization, the PDA 31 is connected to the location unit 10 and all discrete channels 18 are turned Off. In step 310, the switch control logic 100 enters a waiting loop for a Request-to-Send signal from a peripheral 29. When a Request-to-Send signal is received, the switch control logic 100 identifies the requesting channel, in step 320 and waits until the channel is free to transmit, in step 330. The switch control logic then redirects the RS232 MUX to the requesting channel position (step 340) and sends the channel a Clear-to-Send signal (step 350).

The sequence of operation of the active vehicle identification means detection and evasion system of the present invention will now be described with reference to the general flowchart of FIG. 5. The system operation is described with an exemplary mode of speed-trap detection and evasion. At system startup, the Switch Controller first runs through an Init Test, in step 34, to assure its operability, followed by a GPS connection test, in step 36. Having established that the system is in working condition, the regular operation of the system is started, in step 38, by getting a current GPS position reading. In step 40 the current GPS reading is compared with the database entries to determine whether the vehicle is approaching a trap (step 42). If the test of step 42 determines that the vehicle is not approaching a trap, the system checks, in step 44, whether the vehicle has recently passed a trap. If it hasn't—the system loops back to step 38 to get the next GPS position; if it has—the system checks, in step 46, whether the IPD is disabled and loops back to step 38 if it is. If the IPD is enabled, the system disables it before looping back to step 38. If it has been determined in step 42 that the vehicle is approaching a trap, the system checks whether the IPD is enabled, in step 50. If it is—the system loops back to step 38 and if it isn't—the system enables it in step 52 before looping back to step 38.

If more than one IPD 14 is available, an automatic selection of the IPD to be activated may be performed by the system, according to any predefined criterion such as the time of day, the geographical area, etc. Alternatively or additionally, general criteria for activating or not-activating one or more IPDs may be pre-stored in the system, e.g. do not activate any IPD when a red-light trap had been identified, to prevent red-light violation. In another example, there may be interest in not activating an IPD of the type that laser jammer, if it is known that the specific laser trap is one that automatically photographs any vehicle that causes an error signal in the laser speed reading. If manual activation of one or more IPDs is possible, automatic disabling of the manual operation may be achieved by connecting a relay to the IPD's power source. Upon detection of a "do not activate" condition, as described above, the controller may send a "disconnect" command to the relay, whereby no manual operation of the IPD will be possible. A "reconnect" command may subsequently be sent when appropriate.

In the framework of each single IPD, an additional level of selectiveness may be applied for determining, after a specific IPD has been selected, whether to activate it. Various criteria may be used at this level. For example, an IPD 14 may be activated only if the signal detected by the peripheral 29 is of one of predefined frequencies or frequency ranges. Alternatively, one or more analog or digital Radar signal signatures may be predefined to serve as activation triggers for the IPD 14. A mechanism for determining a radar digital signal signature is described in Published PCT Application No. WO 03/034087, incorporated herein by reference. The logic scheme for selectively determining whether one or more IPDs 14 should be activated following a positive identification of a VIM using a frequency range and/or a photo-radar signature, may reside either in the PDA 31 or in the peripheral 29 logic. In the latter case, the peripheral 29 uses a pre-defined database to determine, in response to a specific VIM e.g. photo-radar identification e.g. by photo-radar signature, whether one or more IPDs should be deployed and sends the appropriate deployment command to the PDA 31, or directly to the IPD, as described hereinabove.

The logic applied in steps 42 and 44 of FIG. 5, for determining whether the vehicle is approaching a trap or has passed a trap's detection area will now be explained with reference to the flowchart of FIGS. 6A and 6B. As mentioned above, speed trap coordinates database 28 stores, with reference to each trap coordinate, a sequence of auxiliary coordinates through which the vehicle must pass on its way to the trap.

Figure 5:
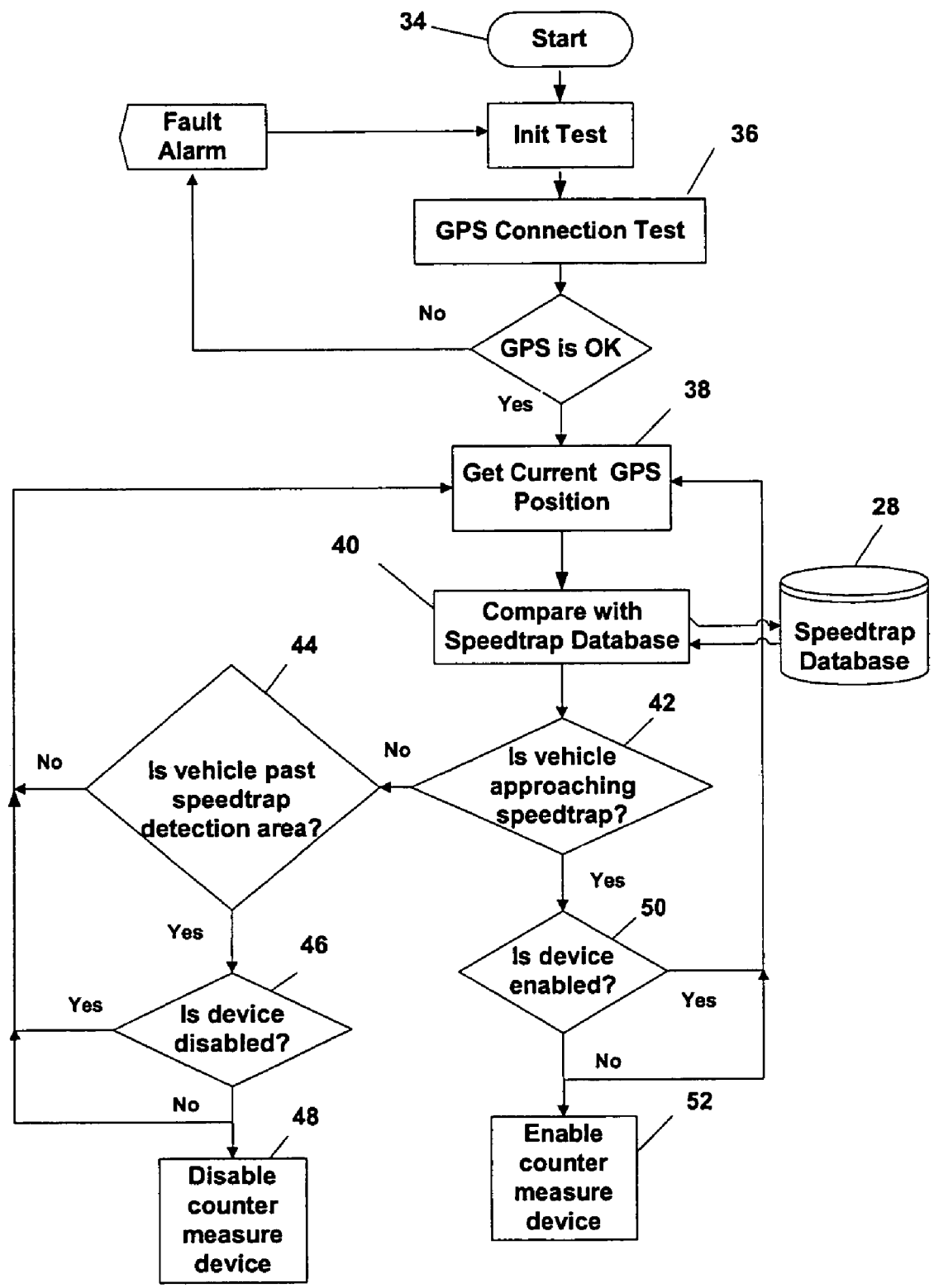
FIG. 5 is a general flow-chart describing the method of the present invention.
Figure 6A:
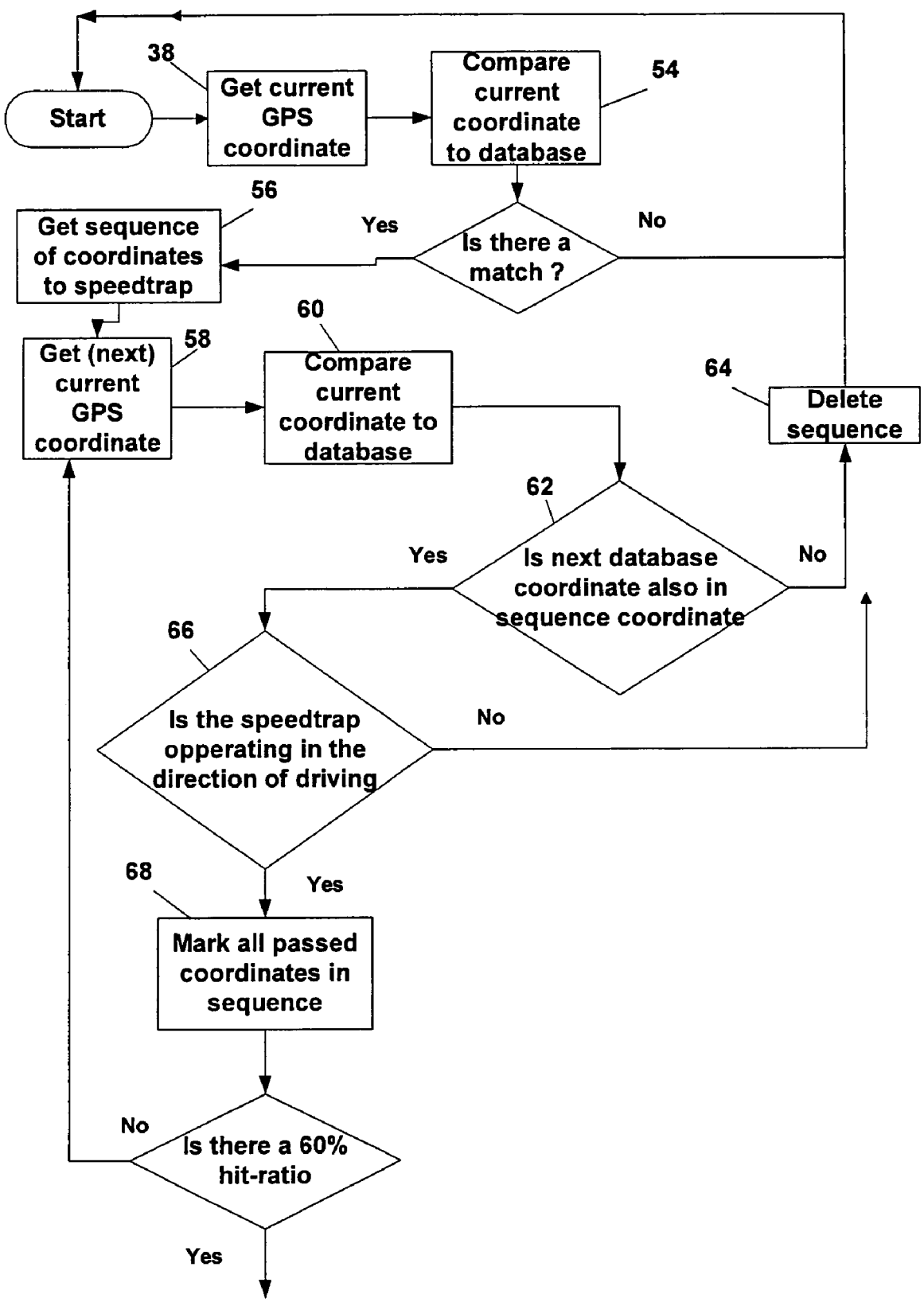
FIGS. 6A and 6B are detailed flow-charts describing the method of the present invention.

In step 38 of FIG. 6A, which is equivalent to step 38 of FIG. 5, a current GPS location is read. Next, the database is searched, in step 54, for a coordinate match. If no match is found, the system loops back to step 38 to get the next GPS coordinate. If a match is found, the system enters an "Approach" mode, in which it will now try to determine whether the vehicle is approaching the trap associated with the matched auxiliary coordinate. In step 56, the entire sequence of auxiliary coordinates, or a first part thereof, is loaded into the PDA memory. The system now gets the next GPS coordinate, in step 58. Again, the database is searched, in step 60, for a coordinate match. If no match is found, the system loops back to step 58, to wait for the next GPS coordinate. If the current coordinate is found in the database, the auxiliary coordinates sequence stored in memory is searched for a match, in step 62, to find out if the vehicle is following the sequence leading to the associated trap. If no match is found in the stored auxiliary coordinates sequence, the sequence is deleted from memory, in step 64 and the system loops back to step 38, to get the next GPS coordinate. The fact that no second match was found in the auxiliary coordinates sequence can be explained either by the fact that the driver has changed course and is no longer heading towards the associated trap, or by a GPS reading fault. In step 66, the order of meeting the matched auxiliary coordinates in the sequence is checked to make sure that the vehicle is traveling in the direction of the trap. If it is not, meaning that the matched auxiliary coordinates have not been met in the correct order, the system determines that the stored auxiliary coordinates sequence is not relevant, deletes it in step 64 and loops back to step 38 to get the next GPS coordinate. Otherwise, if the order of the sequence is held, the currently matched coordinate is marked and a test is made, in step 68, to check if a predetermined percent (hit-ratio), say 60% of the auxiliary coordinates in the sequence have been matched. If the hit-ratio has not been met, the system goes back to step 58 to get the next GPS coordinates. Otherwise, a determination is made that the vehicle is approaching the associated trap. The required hit-ratio being less than 100% takes care of positive detection in cases where an auxiliary coordinate has not been detected, possibly due to GPS error.

It will be appreciated by any person skilled in the art that the example of a speed-trap in FIGS. 5 and 6 is not limiting, and could apply to any Vehicle Identification Means (VIM) as described above.

Figure 6B:
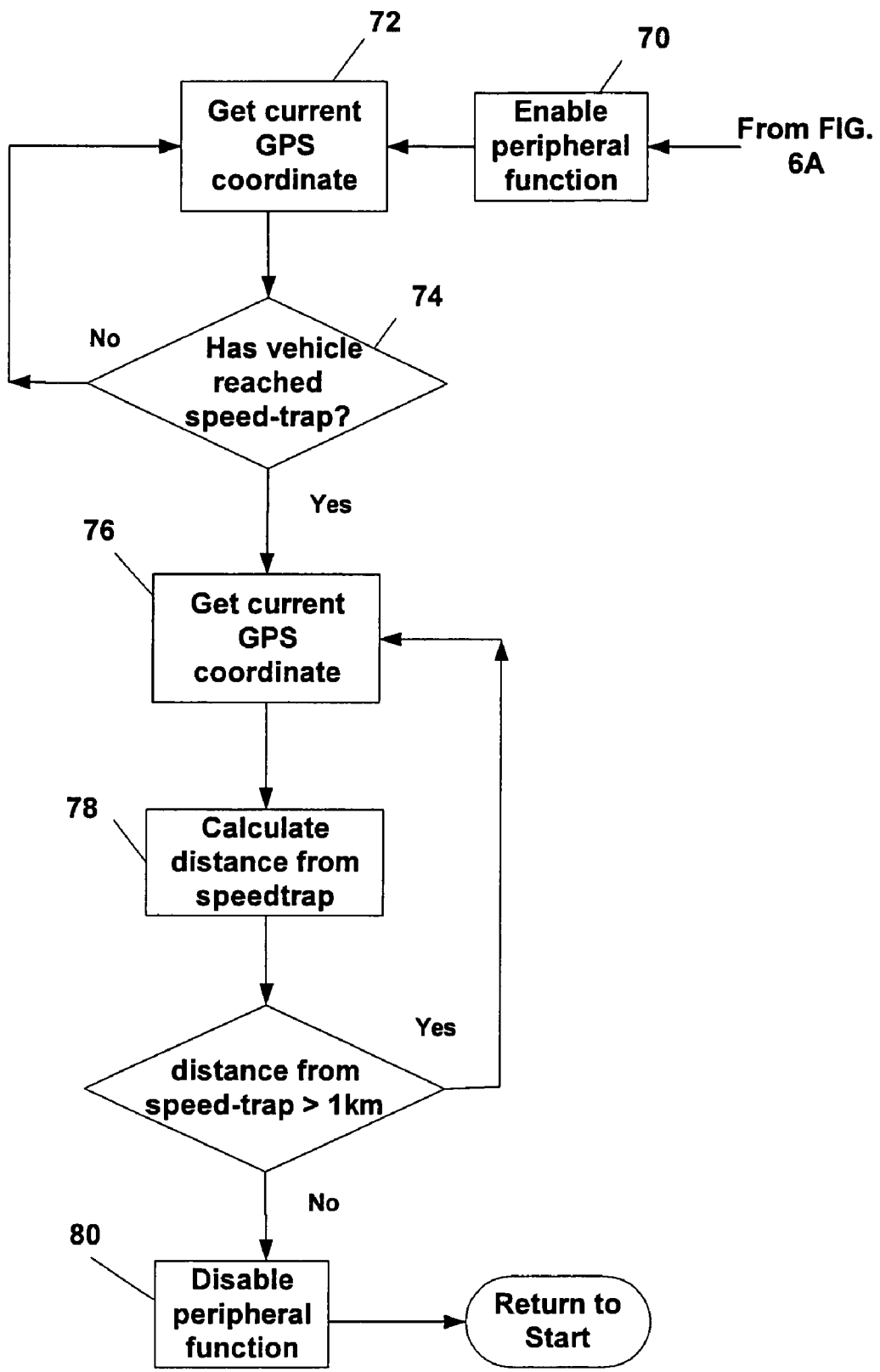

Attention is drawn now to FIG. 6B. When the system has affirmed that the vehicle is approaching the now identified trap, the switch controller 32 enables one or more IPDs (14), in step 70. In a preferred embodiment of the present invention, the speed trap database 28 stores additional information for each trap, such as its detection range, so that the enabling of the IPD(s) can be done timely, based on the vehicle's current coordinate and speed.

When the IPD has been enabled, the system enters a "Lock" mode, in which GPS coordinates are read, in step 72 and compared with the actual trap's coordinate, in step 74, until a match is found, meaning that the vehicle has reached the trap.

The system now enters a "Depart" mode, to determine when the IPD may be turned off. The determination may be made based on a second set of auxiliary coordinates stored in the database, indicating departure from the trap. Alternatively, the stored detection range of the trap may be used to determine when the IPD may be turned off, based on the vehicle's current coordinate and speed. In the embodiment of FIG. 6B, current GPS coordinates are read in step 76, until the calculated distance of the vehicle from the trap exceeds a predefined amount, at which point it is considered to be out of the trap's range. The IPD is turned off in step 80 and the system loops back to step 38, to get the next GPS coordinate.

Figure 7:
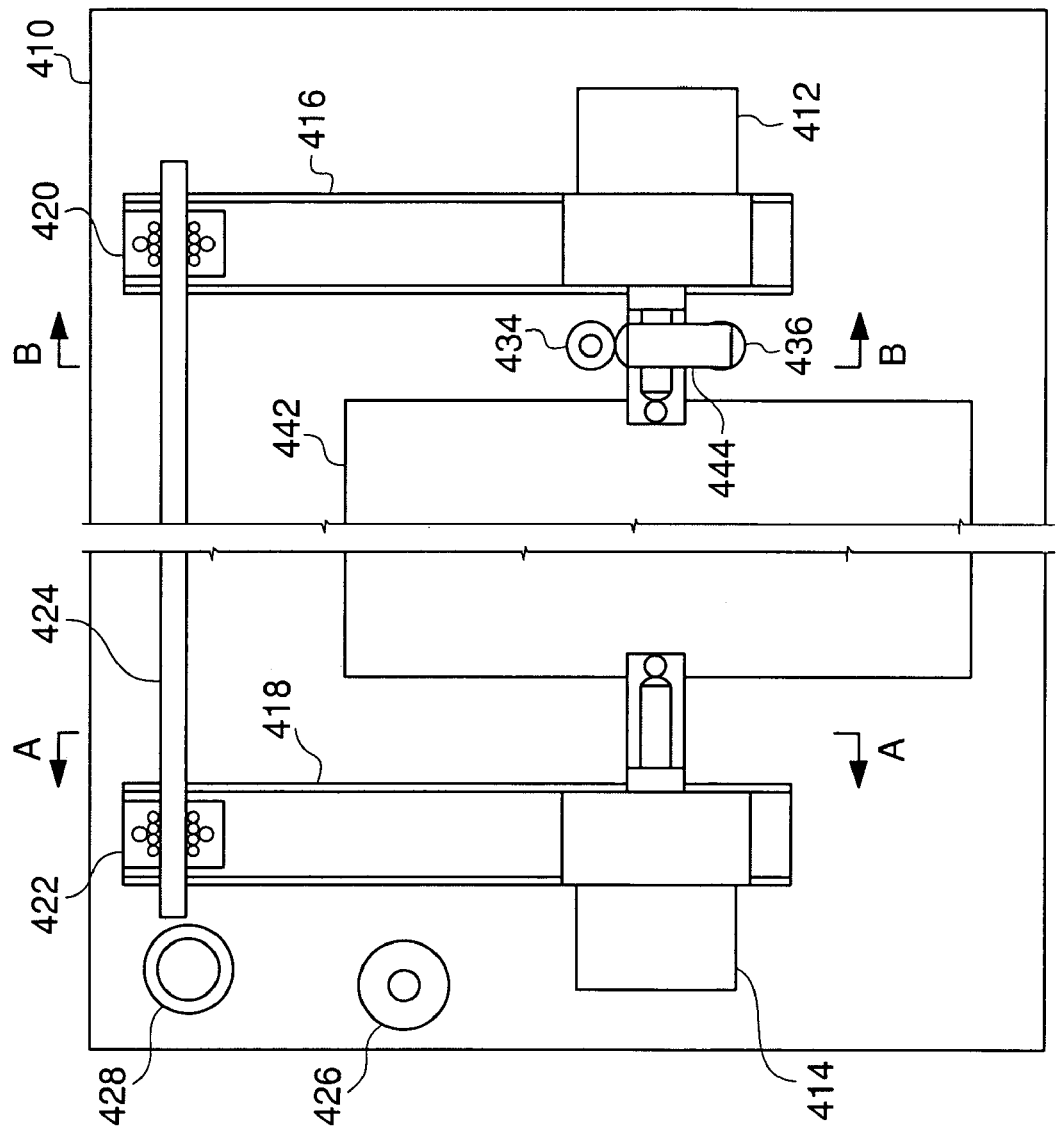
FIG. 7 a schematic block diagram of a license-plate flipper according to a preferred embodiment of the present invention.

Attention is drawn now to FIG. 7—a schematic block diagram of one Identification Prevention Device (IPD) 14 according to the present invention, namely, a license plate flipper, and to FIGS. 8A and 8B, which show cross sections of the license-plate flipper of FIG. 7 along section lines A—A and B—B respectively. The license plate flipper of the present invention is designed to flip the license plate 180°, so that it faces the vehicle's body and is invisible to the outside world. The license plate flipper of the present invention, due to its unique mode of operation, may be mounted on the vehicle's front and/or back panels without the need to keep an operating distance from the vehicle's body. Namely, the flipping operation, as will be described below, requires less than a half-plate width distance between the flipper's pivot axis and the vehicle in order to perform the flipping. Thus, there is no need to cut into the vehicle's body or to install the pivot axis at a distance greater than a half-plate width from the vehicle's body. The pivot axis of the present license plate flipper may be either horizontal or vertical.

The license plate flipper comprises a back-panel 410, attached to the back and/or front of the vehicle, to which the flipping mechanism is attached. Alternatively, the mechanism may be attached directly to the vehicle.

The flipping mechanism comprises a pair of gear motors 412, 414, such as model HN35 GBF15351 available from Hsiang Neng of Taiwan, with a capacity of up to 24V, suitable for any prevailing motor vehicle. The motors 412 and 414 are respectively connected to arms 416 and 418. Arms 416 and 418 are mounted on beams 420 and 422 respectively and are rotatable around rod 424, spanning the two beams. Beams 420 and 422 are screwed to back-panel 410. A switch 426 and a fuse 428 are also connected to the back-panel 410. Alternatively, switch 426 may be placed remotely, e.g. mounted inside the vehicle. Switch 426 is connected as a discrete IPD to Switch Controller 32, as described above. Torque springs 430 and 432 are mounted on rod 424, between arms 416, 418 and beams 420, 422 respectively. The springs are designed to pull the arms back towards back-panel 410, as will be described in detail hereinbelow.

Two adjustable micro-switches 434 and 436 are connected to arm 416 (or to arm 418), for regulating the motors' current direction and motion stopping. Motors 412, 414 have respective shafts 438, 440 which are connected to a panel 442. Panel 442 lies horizontally between the two shafts and has the vehicle's license plate (not shown) attached with its back to it, in an outwardly visible position. In an alternative embodiment, a second license plate may be attached with its back to the second side of panel 442. The second license plate may be, for example, a license plate of a different country. A leaf spring 444 is connected to the shaft 438 of motor 412 (or to shaft 440 of motor 414, depending on where the micro-switches are positioned). Leaf spring 444 is designed to alternately exert force on micro-switches 434 and 436, depending on the direction of the motors' rotation, thus causing the motors to stop rotating timingly and to alternately change their direction of rotation.

Figure 9:
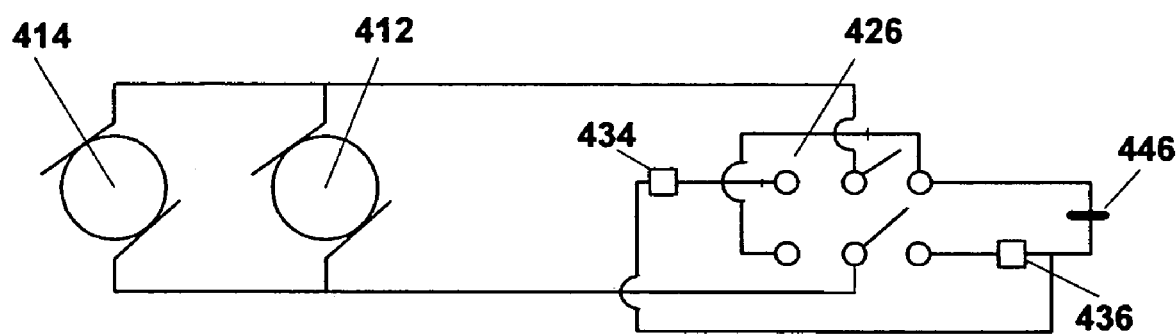
FIG. 9 is a schematic drawing of the electrical scheme of the license-plate flipper of FIG. 7.

FIG. 9 is a schematic drawing of the electrical scheme of the license-plate flipper of the present invention, additionally showing battery 446, which provides the power for the flipping system, and which may be the main battery of the vehicle.

The operation of the license-plate flipper will now be explained in detail. The operation starts by operating switch 426, as explained above with reference to the operation of IPDs. Operation of switch 426 causes current from battery 446 to rotate motor 412 (and motor 414 connected to it) in a specific direction, through the appropriate micro-switch. The rotation of the motors causes panel 442 to rotate. While rotating, panel 442 slides along back-panel 410, according to the direction of rotation. While moving, panel 442 drags arms 416 and 418, which in turn rotate around rod 424 and are lifted off back-panel 410 angularly. When the angle reaches 90°, panel 442 continues its rotation and arms 416, 418 move back towards back-panel 410 with the aid of torque springs 430, 432 respectively. Leaf spring 444, connected to the motor's shaft, rotates along with it. When the leaf spring 444 reaches, say, micro-switch 434, it causes the current of the system to be cut-off. At this time the panel 442 has completed a 180° rotation, thus exhibiting panel 442's bare side, or alternatively, the second license plate that had previously been hidden. The next operation of switch 426 will change the direction of the current supplied by battery 446, causing the motors to rotate in the opposite direction. The sequence of operations as described above will be repeated, with leaf spring 444 operating the other micro-switch.

Figure 10:
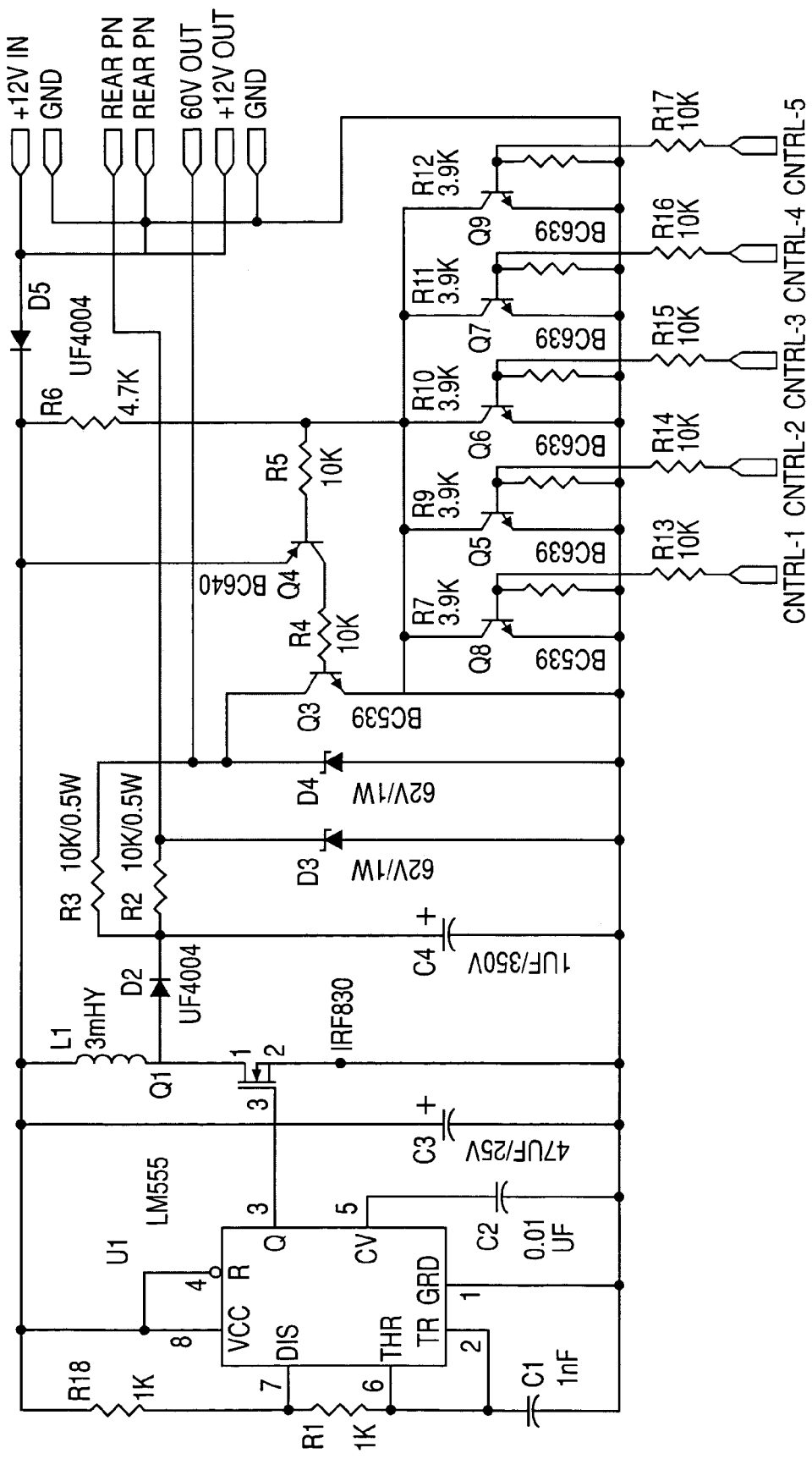
FIG. 10 is an electric scheme of a voltage converter according to the present invention.
Figure 12A:
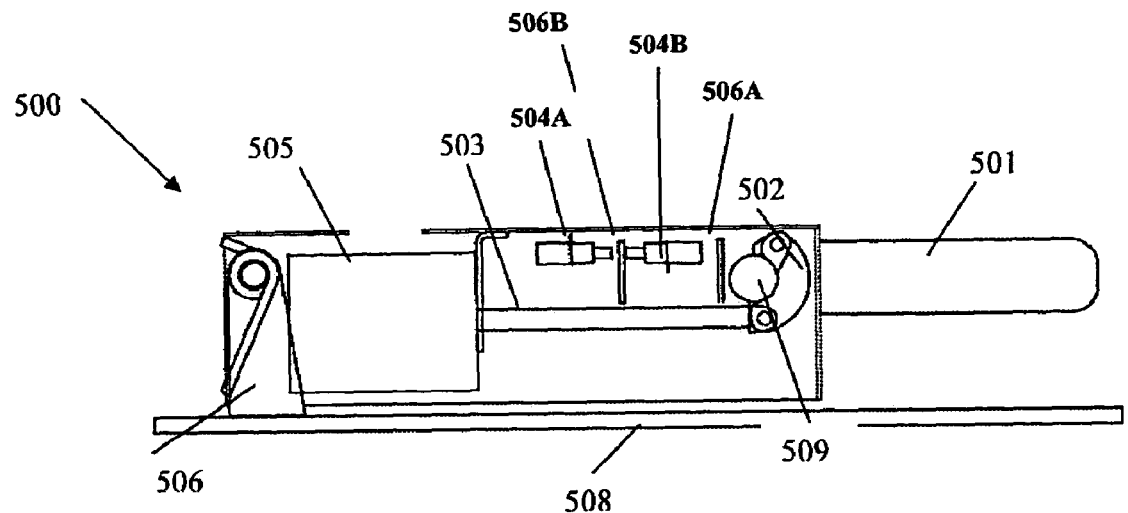
FIGS. 12A through 12E are schemes of an alternative type of license plate flipper according to the present invention.
Figure 12B:
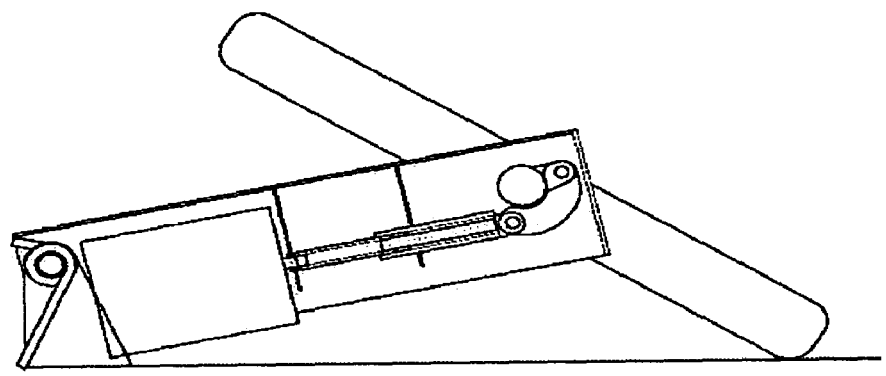
Figure 12C:
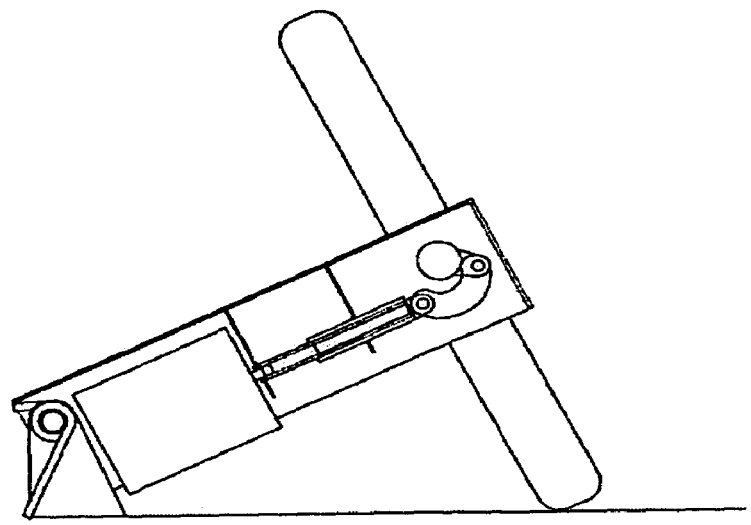
Figure 12D:
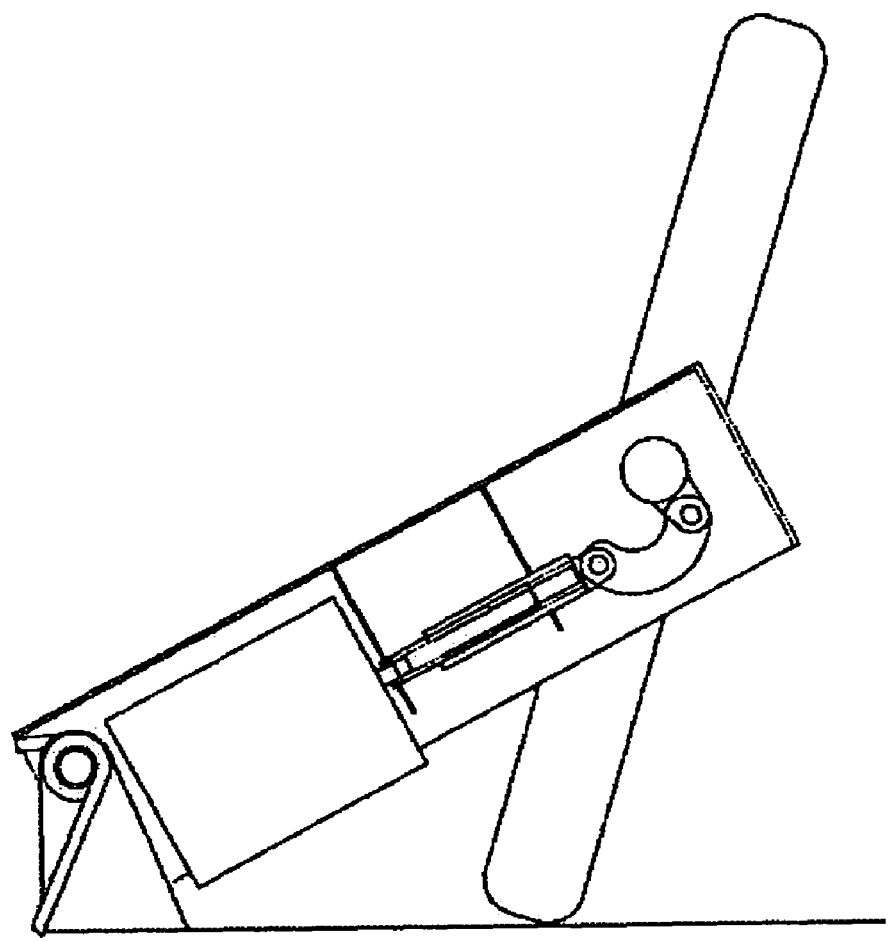
Figure 12E:
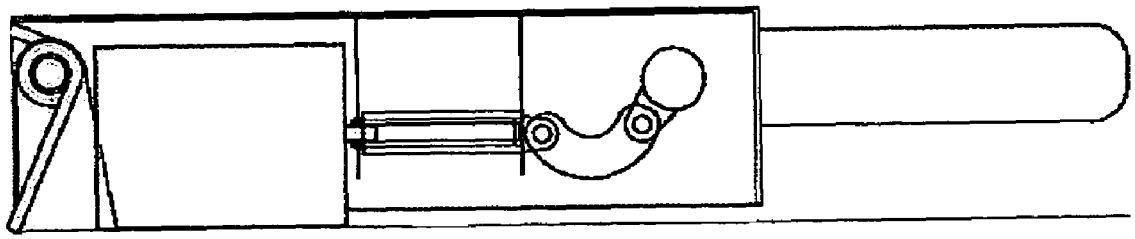

FIG. 10 is an electrical scheme of a 12 Volt to 60–75 Volt voltage converter according to the present invention, to enable operation of the SPD glass as an IPD using the 12 Volt vehicle battery. The same principle may be applied for converting the vehicle battery's current to any other required current.

FIGS. 12A through 12E provide an alternative type of license plate flipper, comprising an actuator, generally denoted by numeral 500. Actuator 500 comprises a linear motor 505, for example an electro magnet or a pneumatic motor, a shaft 503 connected with the motor 505, and multi-link 502 connected with the shaft 503 and with an axel 509. Alternatively, motor 505 may be an electric motor connected to a screw, which is in turn connected to a shaft, wherein the turning of the screw creates a linear motion of the shaft. The axel 509 is connected with the license plate 501. A spring 506 is mounted between the actuator 500 and the base 508, on which the license plate rests, e.g. the vehicle front/back panel. The motor 505 creates a linear motion on shaft 503, which in turn pushes multi-link 502 to create a circular motion and rotate axel 509. When axel 509 rotates, it forces plate 501 to rotate, which causes it to slide along base 508. When plate 501 has turned over 90 degrees, spring 506 forces it to return to the base. These rotation steps are demonstrated in FIGS. 12B through 12E. Two limit switches 504A and 504B and two respective stoppers 506A and 506B, connected at 90 degrees to shaft 503, are responsible for stopping the motor. When the flipping operation is complete, one of the stoppers presses the respective limit switch, thus cutting off the motor. The other pair of limit switch/stopper will provide the identical operation when the plate is flipped back.

Figure 13A:
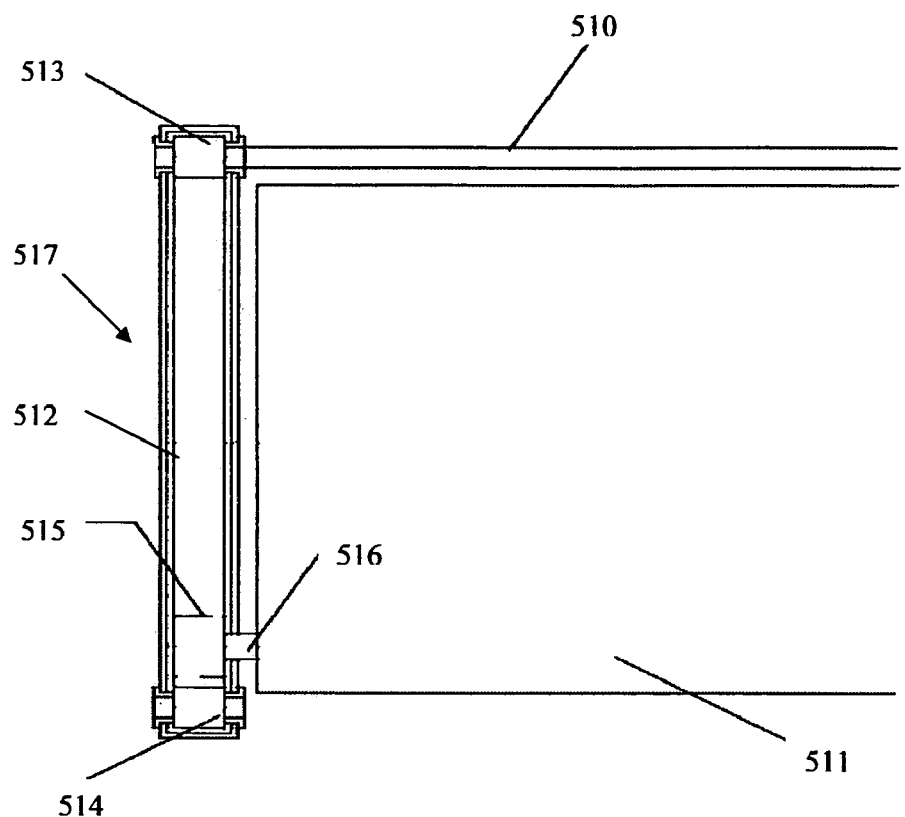
FIGS. 13A and 13B are schemes of yet another type of license plate flipper according to the present invention.
Figure 13B:
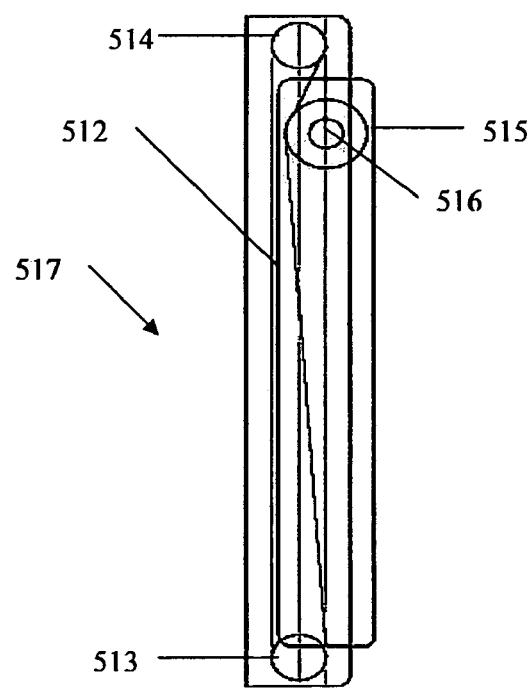

Another type of license plate flipper is demonstrated in FIGS. 13A and 13B. A motor (not shown) is connected to a shaft 510. Shaft 510 may be connected to two trolley systems 517 on the two sides of license plate 511 and synchronize their action, or it can be connected to one trolley system. Shaft 510 has a circular motion and is connected to a timing belt 512. Belt 512 turns between bearing 513 and bearing 514. A belt pulley 515 is suspended inside belt 512 and is connected to a shaft 516, which is connected to license plate 511. When belt 512 turns, pulley 515 has an up-down linear motion and a circular motion around shaft 516. This combines linear/circular motion causes license plate 511 to ascend/descend and rotate.

Figure 14:
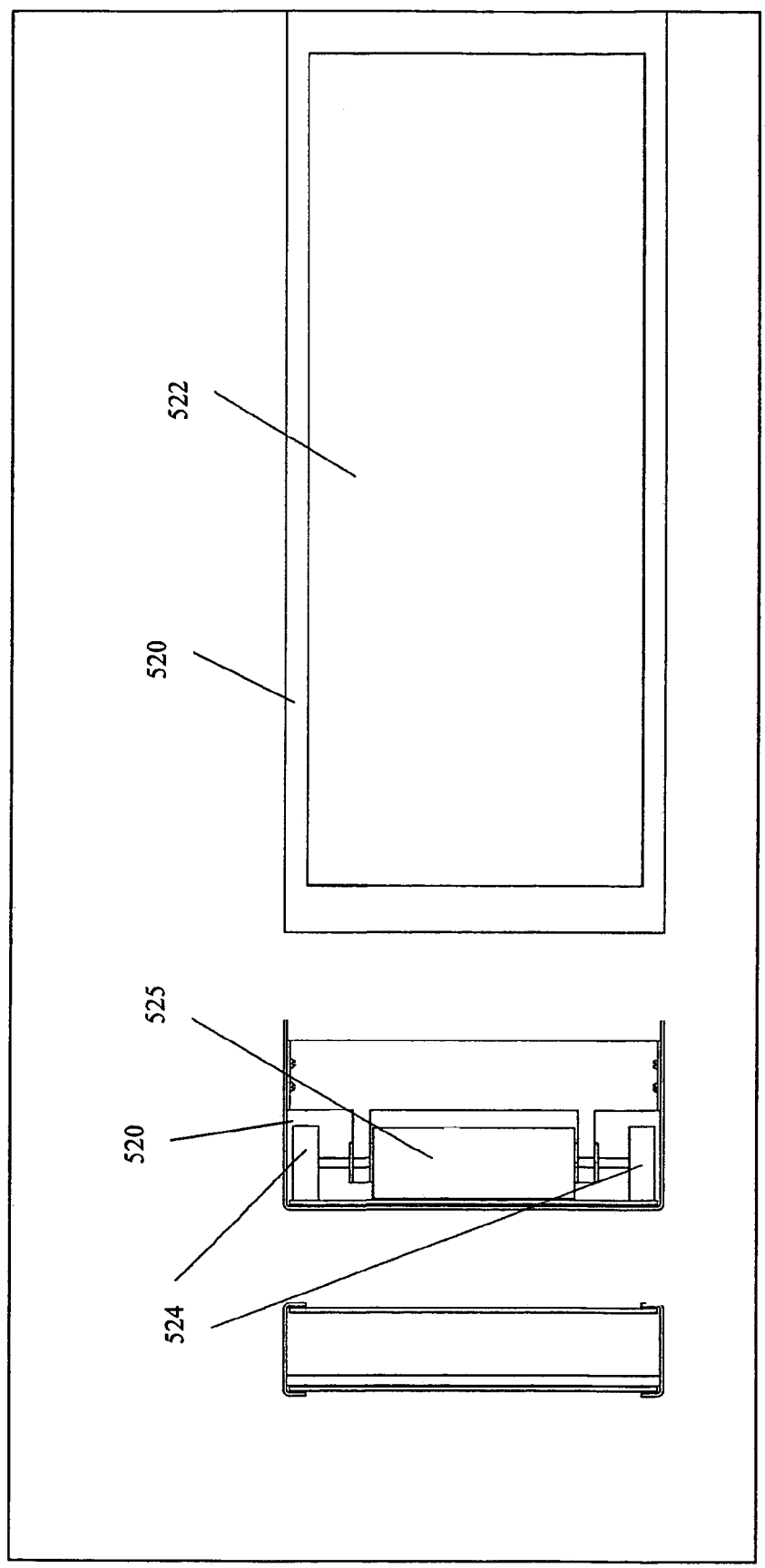
FIGS. 14 and 15 are schemes of license plate covers according to the present invention.

FIG. 14 provides an additional type of IPD, namely a revolving wrapping belt 520, for providing physical covering of the license plate. Wrapping belt 520 is mounted around bearings 524. Wrapping belt 520 has a window hole 522 cut into it. Motor 525 (may be one or two motors) has a circular motion and is connected to bearings 524. Bearings 524 rotate and cause belt 520 to rotate by friction, thus covering or uncovering the license plate as required.

Figure 15:
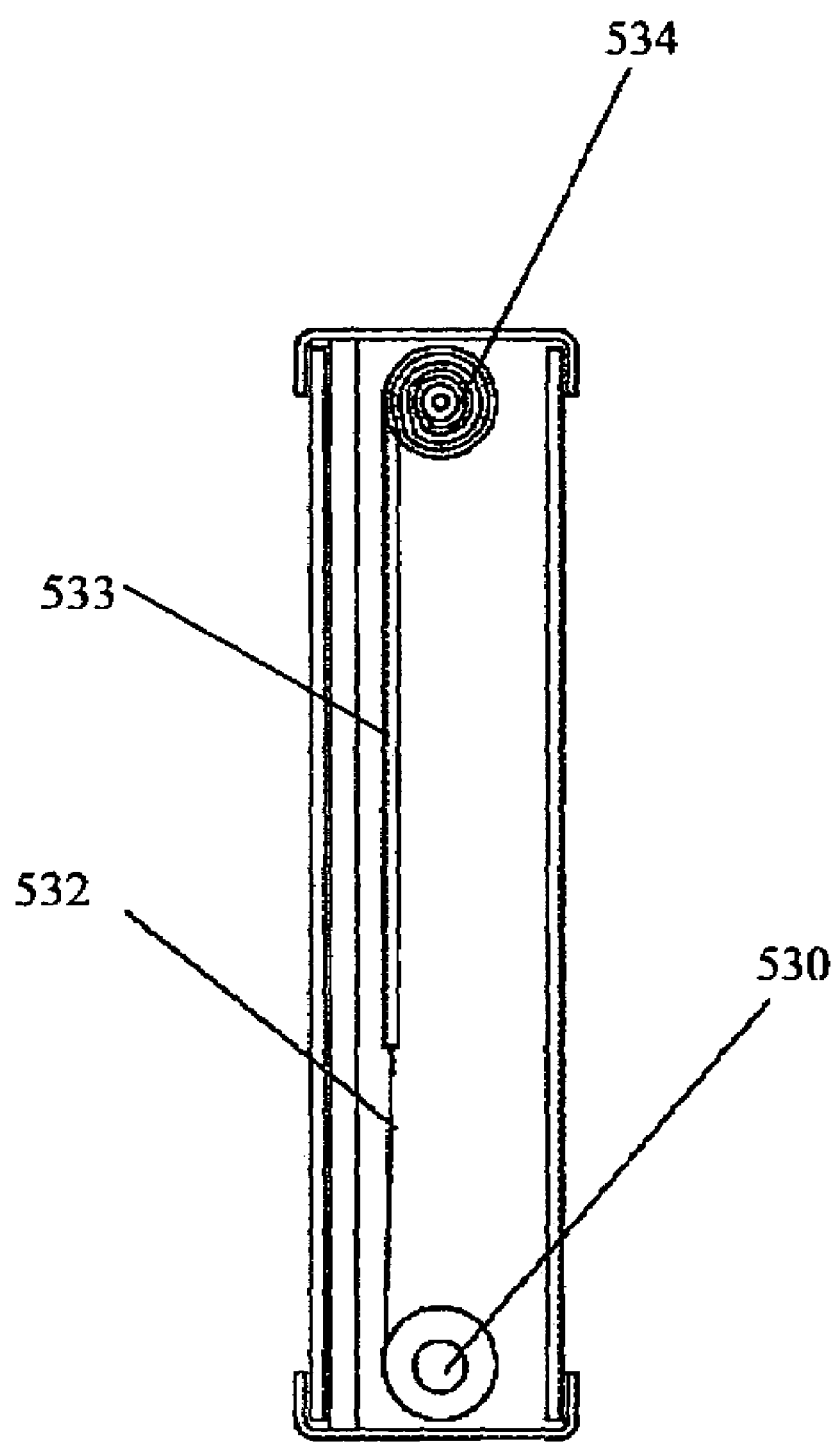

An alternative shielding IPD is provided in FIG. 15. Shaft 530 is attached to a motor (not shown) and has circular motion. Shaft 530 is attached to a string 532, which is in turn attached to a blind 533, the other end of which is wound around a torsion pulley 534. The motor rotates shaft 530 and causes the string 532 to pull the blind 533 down for covering the license plate. When the motor is disconnected, the torsion pulley 534 pulls the blind 532 back to its original position.

Another example of IPD 14 is a license-plate/ID sticker cover comprising standard light scattering LCD (dispersed polymer), also called SPD (suspended particles device) glass, available from Laminated-Technologies (www.laminatedtechnologies.com). The SPD glass comprises millions of suspended particles placed between 2 glass or plastic panels, coated with a transparent conductive material. When a certain voltage/current, e.g. 60 Volt is applied to the suspended particles, via the conductive coating, they line-up in a straight line and allow light to flow through, moving back to a random, light-blocking pattern when the electricity is turned off.

The invention claimed is:

1. A system for detecting and evading vehicle identification means (VIM), comprising:
   locating means for determining a location of a vehicle;
   control means connected with said locating means, said control means having a plurality of I/O channels, each said I/O channel adapted to receive or transmit one of serial data and parallel data;
   processing means connected with said control means;
   electronic storage means connected with said processing means, said electronic storage means comprising at least one database of known VIM coordinates; and
   at least one identification prevention device (IPD) connected with said control means, said at least one IPD adapted to prevent identification of at least one of said vehicle's license plate number, owner, driver and interior,
   said control means adapted to automatically select said at least one IPD and to selectively activate or deactivate said selected IPD according to predefined criteria selected from the group consisting of predefined frequencies, predefined frequency ranges and predefined digital signal signatures.

2. The system of claim 1, wherein said IPD comprises one or more light sources.

3. The system of claim 2, wherein said one or more light sources comprise one or more laser diodes.

4. The system of claim 3, wherein said one or more laser diodes comprise one or more tunable laser diodes.

5. The system of claim 2, wherein said one or more light source comprise light sources having different wavelengths.

6. The system according to claim 1, wherein said at least one IPD comprises a license plate covering system.

7. The system of claim 6, wherein said license plate covering system comprises:
a power source;
a revolving wrapping belt mounted around two bearings, said wrapping belt comprising a cut-out window; and
one or two motors connected with said bearings, said one or more motors having a circular motion.

8. The system of claim 6, wherein said license plate covering system comprises:
a power source;
a shaft connected with a motor having circular motion;
a string connected with said shaft; and
a blind connected with said string and wrapped around a torsion pulley.

9. A method of detecting and evading vehicle identification means (VIM), comprising the steps of:
providing a VIM detection and evasion system, comprising:
locating means for determining a location of a vehicle;
control means connected with said locating means, said control means having a plurality of I/O channels, each said I/O channel adapted to receive or transmit one of serial data and parallel data;
processing means connected with said control means;
electronic storage means connected with said processing means, said electronic storage means comprising at least one database of known VIM coordinates; and
at least one identification prevention device (IPD) connected with said control means, said at least one IPD adapted to prevent identification of at least one of said vehicle's license plate number, owner, driver and interior,
said control means adapted to automatically select said at least one IPD;
reading current location indication from said locating means;
comparing said current location indication with at least part of said VIM coordinates in said at least one database; and
selectively enabling or disabling, based on said step of comparing, said selected IPD, said selective enabling or disabling based on predefined criteria selected from the group consisting of predefined frequencies, predefined frequency ranges and predefined digital signal signatures.

10. The method of claim 9, additionally comprising the step of storing information related to said VIM in said at least one database.

11. The method of claim 10, additionally comprising the step of updating a central database with said stored information.

12. The method of claim 9, additionally comprising the step of updating said at least one database by downloading data from a central database.

13. A system for detecting and evading vehicle identification means (VIM), comprising:
control means comprising at least one I/O channel, each said I/O channel adapted to receive or transmit one of serial data and parallel data;
processing means connected with said control means;
at least one VIM detector connected with said control means; and
at least one identification prevention device (IPD) connected with said control means, said at least one IPD adapted to prevent identification of at least one of vehicle's license plate number, owner, driver and interior;
said control means adapted to automatically select said at least one IPD and to selectively activate or deactivate said selected IPD according to predefined criteria selected from the group consisting of redefined frequencies, predefined frequency ranges and predefined digital signal signatures.

14. The system of claim 13, wherein said VIM comprises photographic means.

15. The system of claim 13, wherein said at least one VIM detector comprises at least one fast slave flash trigger adapted to identify one or more light frequency ranges.

16. The system of claim 15 wherein said at least one fast slave flash trigger comprises a plurality of parallel flash triggers, each adapted to identify a predefined light frequency range.

17. A The system of claim 15, wherein said at least one fast slave flash trigger circuit comprises:
a phototransistor, operable to deliver a logical "high" signal upon picking up a predefined wavelength range;
a dual differential comparator connected with said phototransistor, for receiving the logical "high" signal and outputting a logical "low" signal; and
a monostable multi vibrator (MMV), for receiving the logical "low" signal from said comparator and outputting a signal of predefined length,
wherein the circuit is connected through a 3-lead connector to a constant +12V power supply and to common ground, the 3-lead connector additionally operable to hold the output signal of the circuit.

18. The system of claim 13, wherein said at least one IPD and said at least one VIM detector communicates with said control means wirelessly.

19. The system of claim 18, wherein said wireless communication comprises Bluetooth communication.

20. The system of claim 13, wherein said at least one VIM detector is connected directly with said at least one IPD.

21. The system of claim 20, wherein said at least one VIM detector communicates with said at least one IPD wirelessly.

22. The system of claim 21, wherein said wireless communication comprises Bluetooth communication.

23. The system of claim 13, additionally comprising a database for storing information related to detected VIMs.

24. The system of claim 23, additionally comprising means for communicating said stored information to a central database.

25. The system of claim 23, additionally comprising means for updating said stored information from a central database.

26. The system according to claim 13, wherein said at least one IPD comprises a license plate covering system.

27. The system of claim 26, wherein said license plate covering system comprises:
a power source;

a revolving wrapping belt mounted around two bearings, said wrapping belt comprising a cut-out window; and
one or two motors connected with said bearings, said one or more motors having a circular motion.

28. The system of claim 26, wherein said license plate covering system comprises:
a power source;
a shaft connected with a motor having circular motion;
a string connected with said shaft; and
a blind connected with said string and wrapped around a torsion pulley.

29. A method of detecting and evading vehicle identification means (VIM), comprising the steps of:
providing a VIM detection and evasion system, comprising:
control means comprising at least one I/O channel, each said I/O channel adapted to receive or transmit one of serial data and parallel data;
processing means connected with said control means;
at least one VIM detector; and
at least one identification prevention device (IPD) connected with said control means, said at least one IPD adapted to prevent identification of at least one of vehicle's license plate number, owner, driver and interior;
said control means adapted to automatically select said at least one IPD and selectively activate or deactivate said selected IPD according to predefined criteria selected from the group consisting of predefined frequencies, predefined frequency ranges and predefined digital signal signatures;
receiving a VIM identification signal from said at least one VIM detector; and
communicating said signal to said processing means.

30. The method of claim 29, wherein said VIM comprises photographic means.

31. The method of claim 29, wherein said at least one VIM detector comprises at least one fast slave flash trigger adapted to identify one or more light frequency ranges.

32. The method of claim 31 wherein said at least one fast slave flash trigger comprises a plurality of parallel flash triggers, each adapted to identify a predefined light frequency range.

33. The method of claim 29, additionally comprising the step of storing information related to said VIM in a database.

34. The method of claim 33, additionally comprising the step of updating a central database with said stored information.

35. The method of claim 33, additionally comprising the step of updating said stored information by downloading from a central database.

36. A system for detecting and evading vehicle identification means (VIM), comprising:
at least one VIM detector; and
at least one identification prevention device (IPD) communicating with said at least one VIM detector, said at least one IPD adapted to prevent identification of at least one of vehicle's license plate number, owner, driver and interior,
said at least one VIM detector adapted to automatically activate or deactivate said at least one IPD according to predefined criteria selected from the group comprising predefined frequencies, predefined frequency ranges and predefined digital signal signatures.

37. The system of claim 36, wherein said at least one VIM detector comprises a radar detector.

38. The system according to claim 36, wherein said at least one IPD comprises a license plate covering system.

39. The system of claim 38, wherein said license plate covering system comprises:
a power source;
a revolving wrapping belt mounted around two bearings, said wrapping belt comprising a cut-out window; and
one or two motors connected with said bearings, said one or more motors having a circular motion.

40. The system of claim 38, wherein said license plate covering system comprises:
a power source;
a shaft connected with a motor having circular motion;
a string connected with said shaft; and
a blind connected with said string and wrapped around a torsion pulley.

* * * * *